US012381510B2

(12) United States Patent
Roux Hameed

(10) Patent No.: US 12,381,510 B2
(45) Date of Patent: Aug. 5, 2025

(54) RETRACTABLE SOLAR SYSTEM

(71) Applicant: Sofia Tallula Roux Hameed, Vancouver (CA)

(72) Inventor: Sofia Tallula Roux Hameed, Vancouver (CA)

( * ) Notice: Subject to any disclaimer, the term of this patent is extended or adjusted under 35 U.S.C. 154(b) by 2 days.

(21) Appl. No.: 18/219,226

(22) Filed: Jul. 7, 2023

(65) Prior Publication Data

US 2024/0014776 A1 Jan. 11, 2024

Related U.S. Application Data

(60) Provisional application No. 63/524,164, filed on Jun. 29, 2023, provisional application No. 63/359,013, filed on Jul. 7, 2022.

(51) Int. Cl.
*H02S 30/20* (2014.01)
*H02S 20/22* (2014.01)

(52) U.S. Cl.
CPC .............. *H02S 30/20* (2014.12); *H02S 20/22* (2014.12)

(58) Field of Classification Search
CPC .......... H02S 30/20; H02S 10/40; H02S 20/22; Y02E 10/47; Y02E 10/50
See application file for complete search history.

(56) References Cited

U.S. PATENT DOCUMENTS

2012/0313569 A1* 12/2012 Curran ................... H02S 30/20
136/246
2021/0203269 A1* 7/2021 Kasefang ............... B62D 63/08

FOREIGN PATENT DOCUMENTS

WO WO-2017165913 A1 * 10/2017

OTHER PUBLICATIONS

Chesebro, J., et al., "Deployable and Retractable Solar Array Mechanism for Satellite Applications," Scholarly Open Access Repository at University of Southern Indiana, Jun. 20, 2022, 50 pages.
Fenn, D., "Feasibility Investigation of a Cubeset Modular and Rotatable Solar Array," San Jose State University, May 2015, 45 pages.
Jasmin, B., et al. "An Origami-Based Portable Solar Panel System," Langara College, Date: 2018, 5 pages.

* cited by examiner

*Primary Examiner* — Angelo Trivisonno
(74) *Attorney, Agent, or Firm* — Nutter McClennen & Fish LLP

(57) ABSTRACT

A photovoltaic system includes a frame configured to removably couple to a structure. A first photovoltaic panel is coupled to a first portion of the frame, the first photovoltaic panel having a first side configured to face away from the frame, the first side comprising a first area of photovoltaic material. A second photovoltaic panel is movably coupled to a second portion of the frame, the second photovoltaic panel comprising a first side configured to face away from the frame, the first side of the second photovoltaic panel comprising a second area of photovoltaic material. A movement mechanism is coupled to the frame, the movement mechanism configured to cause the second photovoltaic panel to move between a first configuration and a second configuration.

18 Claims, 11 Drawing Sheets

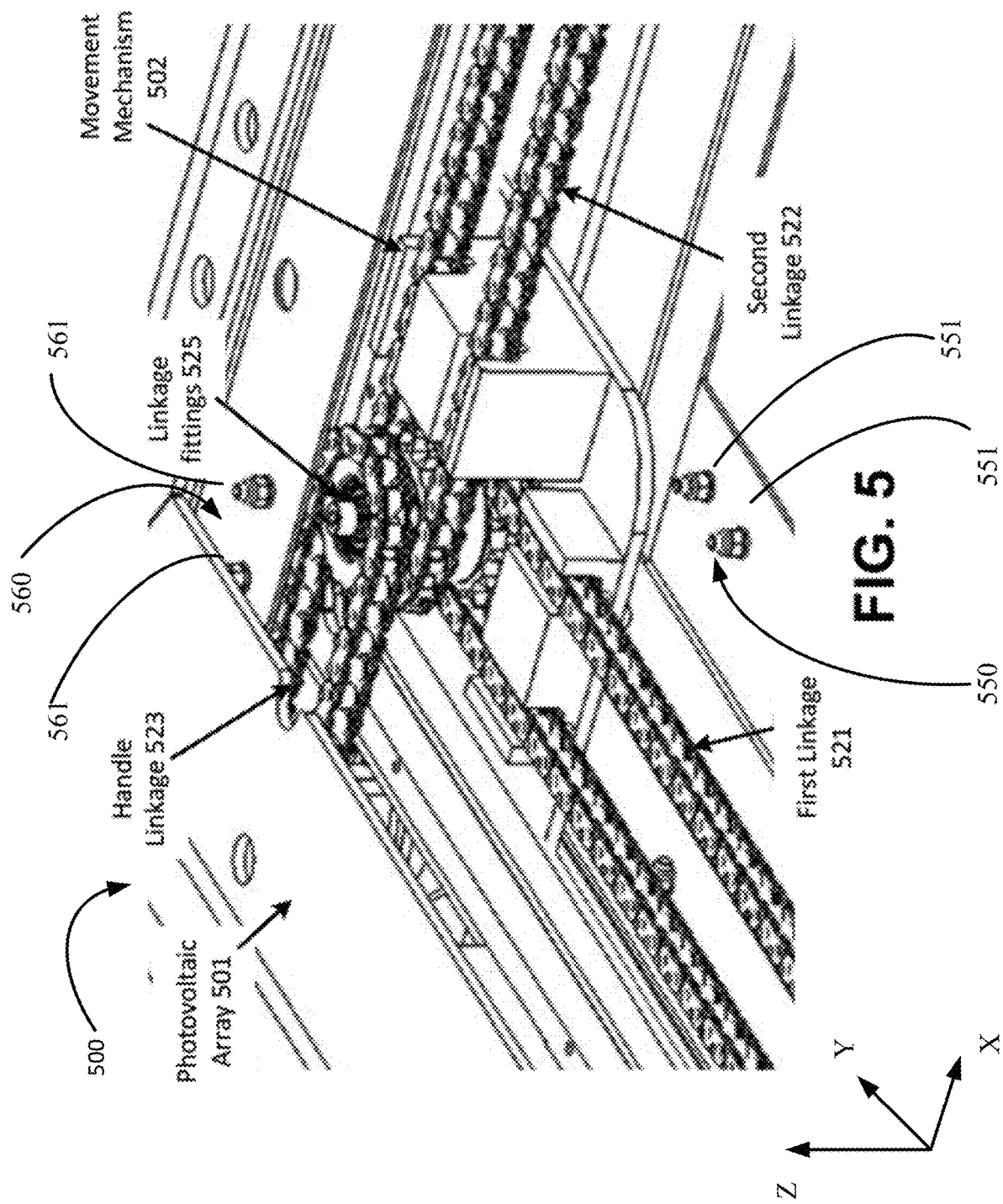

RETRACTABLE SOLAR SYSTEM

CROSS-REFERENCE TO RELATED APPLICATIONS

This application claims priority to U.S. Provisional Application No. 63/524,164 filed Jun. 29, 2023 and titled "Retractable Solar System" and naming Sofia Tallula Roux Hameed as inventor, and claims priority to U.S. Provisional Application No. 63/359,013, filed Jul. 7, 2022 and titled "Retractable Solar Roof System" and naming Sofia Tallula Roux Hameed as inventor. The disclosure of each of the foregoing is incorporated herein by reference, in its entirety.

TECHNICAL FIELD

Embodiments of the disclosure relate generally photovoltaic arrays, and, more particularly, to improving the security of photovoltaic arrays.

BACKGROUND

Photovoltaic arrays have wide use around the world. Nevertheless, there are 800 million people currently living without access to electricity. Bringing electricity and connectivity to the last mile is a global development priority, and photovoltaic arrays can present a simplified approach to providing more people with access to electricity.

SUMMARY OF VARIOUS EMBODIMENTS

In accordance with one embodiment a photovoltaic system includes:
  a frame configured to removably couple to a structure;
  a first photovoltaic panel coupled to a first portion of the frame by a first set of panel fasteners, the first photovoltaic panel comprising a first side configured to face away from the frame, the first side comprising a first area of photovoltaic material;
  a second photovoltaic panel movably coupled to a second portion of the frame by a second set of panel fasteners, the second photovoltaic panel comprising a first side configured to face away from the frame, the first side of the second photovoltaic panel comprising a second area of photovoltaic material; and
  a movement mechanism coupled to the frame, the movement mechanism configured to cause the second photovoltaic panel to move between a secured configuration and an exposed configuration, wherein the first set of panel fasteners and the second set of panel fasteners are obscured from external access when the system is in the secured configuration.

In accordance with another embodiment, a photovoltaic system includes: a frame comprising a fixed portion configured to removably couple to a structure, and a set of moveable petals, each movable petal controllably movable relative to the fixed portion; a set of photovoltaic panels, each photovoltaic panel of the set of photovoltaic panels coupled to a corresponding one of the moveable petals by a corresponding set of panel fasteners; and a movement mechanism operably coupled to the set of moveable petals, the movement mechanism configured to controllably cause each moveable petal to move, relative to the fixed portion of the frame, between a secured configuration and an exposed configuration.

In some such embodiments, the movement mechanism is configured to be manually powered.

In some embodiments, each set of panel fasteners is obscured from external access when its corresponding petal is in the secured configuration.

In some embodiments, the set of petals comprises a plurality of petals, and in the secured configuration, the petals are disposed in a stacked configuration relative to one another.

In some embodiments, each petal is configured to be controllably repositioned with respect to a location of a light source.

In some embodiments, the fixed portion of the frame defines a frame plane, and each petal of the set of petals is moveably coupled to the frame to as to rotate out of the frame plane.

In some embodiments, the fixed portion of the frame defines a frame plane, and wherein each petal of the set of petals is movably coupled to the fixed portion of the frame by a rail and is configured to move along a path of the rail so as to translate in a plane parallel to the frame plane.

In some embodiments, for each petal, its set of panel fasteners is obscured from external access when the petal is in the secured configuration, and said set of panel fasteners is accessible from space outside the frame when the petal is in the exposed configuration, such that a photovoltaic panel is removable from the petal when the petal is in the exposed configuration.

In some embodiments, the frame is removably coupled to the structure by a set of frame fasteners, and when the set of petals is in the secured configuration, the set of frame fasteners is obscured from external access; and when the set of petals is in the exposed configuration, the set of frame fasteners is exposed such that said set of frame fasteners are accessible from space outside of the first portion of the frame such that said set of frame fasteners can be removed from the fixed portion of the frame.

In some embodiments, the movement mechanism includes at least one of a crank system, a hydraulic system, a pneumatic system, or an electrical system.

In some embodiments, the movement mechanism is configured to be operated with a keyed handle configured to removably couple to the movement mechanism.

In some embodiments, the movement mechanism comprises a rod configured to rotate about a first axis, a first end of the rod configured to removably couple to with the keyed handle, and a second end of the rod coupled to a first gear, the first gear configured to engage a first chain, the first chain configured to move the set of petals between the open configuration and the secured configuration, wherein rotating the keyed handle about a second axis causes the rod to rotate about the first axis, and wherein the movement mechanism is mechanically disadvantaged from operating without the keyed handle.

In some embodiments, a portion of a housing around the movement mechanism is configured to removably couple to the frame.

In some embodiments, the structure comprises a shipping container.

Some embodiments further include a set of fixed photovoltaic panels removably secured to the fixed portion of the frame.

Some embodiments further include an electrical system that electrically couples to the set of photovoltaic panels in the exposed configuration, wherein the electrical system is configured to electrically couple the photovoltaic panels to an inverter, wherein the inverter is electrically coupled to a battery system.

In another embodiment, an apparatus for securing photovoltaic panels includes: a frame configured to removably couple to a structure; a first portion of the frame configured to receive at least a first photovoltaic panel, wherein the first portion is configured couple to a first side of the first photovoltaic panel, wherein a second side of the photovoltaic panel comprises a first are of photovoltaic material; a second portion of the frame configured to receive at least a second photovoltaic panel, wherein the second portion of the frame is configured to movably couple to a first side of the second photovoltaic panel, wherein a second side of the second photovoltaic panel comprises an area of photovoltaic material; and a movement mechanism coupled to the frame, the movement mechanism configured to cause the second photovoltaic panel to move between a first configuration and a second configuration.

In some embodiments, the frame is configured to removably couple to the structure by a set of fasteners, wherein the set of fasteners are obscured in the first configuration, wherein a subset of fasteners of the set of fasteners can removably couple the frame to the structure when the second photovoltaic panel is in the second configuration.

Yet another embodiment includes a system having a frame removably coupled to a kiosk, wherein the kiosk comprises a first space and a second space; a first photovoltaic panel coupled to a fixed portion of the frame, the first photovoltaic panel comprising a first side configured to face away from the frame, the first side comprising a first area of photovoltaic material; a second photovoltaic panel coupled to a moveable portion of the frame, the second photovoltaic panel comprising a first side configured to face away from the frame, the first side of the second photovoltaic panel comprising a second area of photovoltaic material; a movement mechanism configured to cause the second photovoltaic panel to move between a first configuration and a second configuration, wherein a first portion of a housing of the movement mechanism is removably coupled to the frame, wherein a second portion of the housing of the movement mechanism is removably coupled to the kiosk; and an electrical sub-system electrically coupled to the first photovoltaic panel and the second photovoltaic panel respectively, wherein components of the electrical sub-system are physically coupled to the first photovoltaic panel and the second photovoltaic panel respectively, such that respective components of the electrical sub-system physically coupled to the second photovoltaic panel are configured to move with the second photovoltaic panel when the movement mechanism is engaged.

In some embodiments, the kiosk comprises a first space divided from a second space, and wherein the electrical sub-system further includes: an inverter within the first space of the kiosk, the inverter configured to electrically couple to the first photovoltaic panel and the second photovoltaic panel; and a battery system within the first space of the kiosk, the battery system configured to electrically couple to the inverter.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5 schematically illustrates a close-up view of a portion of the movement mechanism in photovoltaic array, in accordance with embodiments of the present disclosure.

DETAILED DESCRIPTION

Figure 1A:
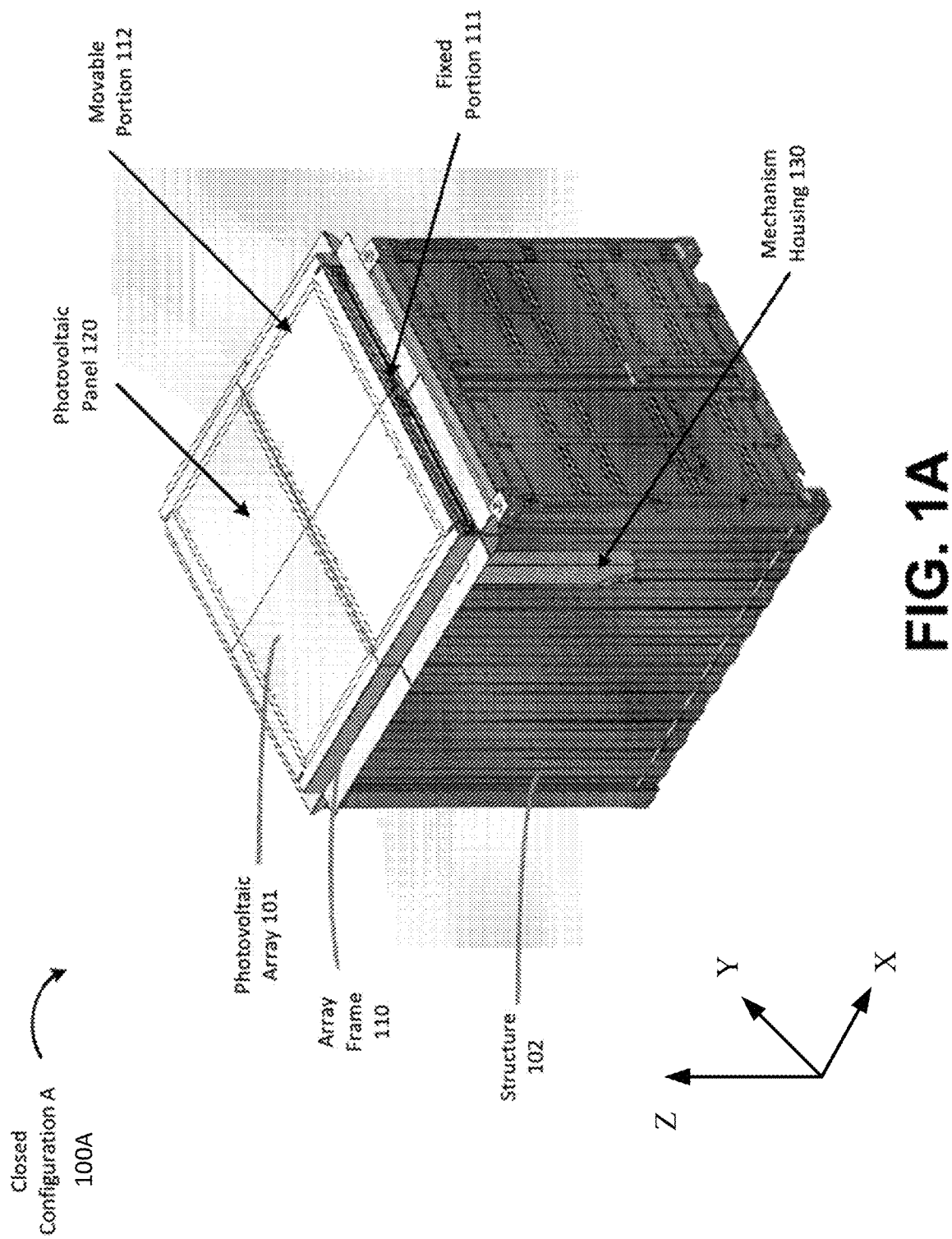
FIG. 1A schematically illustrates a photovoltaic array mounted to a structure in a closed configuration, in accordance with embodiments of the present disclosure.

Aspects of the present disclosure are directed to a retractable solar system. Illustrative embodiments are configured to be removably coupled to a supporting structure so as to be easily installed onto the supporting structure and easily removed from the supporting structure. A supporting structure may be a shipping container or a building, to name but a few examples. Illustrative embodiments provide electrical power to transform the supporting structure into education space (e.g., a school) or office space, to name but a few examples, without having to supply electrical power to the supporting structure from an external source, such as a power grid or fossil fuel-powered electrical generator.

Illustrative embodiments also include features to prevent or mitigate theft of solar panels that are coupled to or part of the retractable solar system. For example, in illustrative embodiments, a set of solar panels is retractable from an exposed configuration into a secured configuration, such that fasteners securing said set of solar panels are obscured so that said fasteners cannot be removed (and the panels subsequently removed) because said fasteners are not accessible to a thief. Moreover, in illustrative embodiments, a set of solar panels is extendable from the secured configuration to an exposed configuration, so that extended solar panels may be exposed to light and so may generate electrical power.

Photovoltaic arrays are widely used around the world. Nevertheless, there are 800 million people currently living without access to electricity. Increasing access to sustainable energy sources, including solar power, has the potential to transform educational opportunities, capacity for innovation, and the financial outlook in the world's frontier markets. Bringing electricity and connectivity to the last mile is a global development priority. However, the pace of expansion and inclusion of efforts to address energy poverty can be limited by the portability and the security of micro level solar power systems (e.g., power systems that include photovoltaic arrays). Generally, efforts to increase portability and security of solar power systems, and features to improve safety and maintenance of such systems, have been lacking.

Photovoltaic arrays have mainly been permanent installations for use in fixed, relatively secure locations. The location of the photovoltaic array may be selected after thorough examination of available sunlight, shading, panel orientation, physical security, distance to power distribution sites, etc. The photovoltaic array may be optimized for maximum photovoltaic array efficiency and/or output. Depending on the location of the photovoltaic array installation, permits and approvals may be obtained before beginning work on the photovoltaic array installation. Photovoltaic arrays require various components in addition to solar panels, including mounting systems, inverters, wiring, and associated hardware. Such photovoltaic arrays are constructed such that once built, the photovoltaic array can be electrically connected to an external load or power grid to distribute the energy the photovoltaic array generates from the sun. Running lengths of electrical connections between mounted panels can provide additional challenges if not properly considered during the construction stage. Finally, the photovoltaic array might be physically secured to prevent theft, vandalism and/or accidental damage.

In areas with limited skilled labor to install and service photovoltaic arrays, and/or limited access to the specialty components required to install or service photovoltaic arrays, the various challenges listed above can make installing a photovoltaic array even more challenging. In some areas, even if the photovoltaic array is installed, the photovoltaic array may still require enhanced physical security, (e.g., human guards) to protect the photovoltaic array equipment from theft, vandalism and/or accidental damage. In such areas, (e.g., rural areas, areas of limited development, construction sites, etc.) all of these additional costs and considerations can prevent a photovoltaic array from being a viable course of action.

Portable photovoltaic arrays can potentially mitigate some of the challenges present with permanent or semi-permanent photovoltaic array installations. However, implementations of portable arrays can often be bulky, expensive, or difficult to securely store and quickly deploy, which can limit their usefulness.

Definitions

As used in this description and the accompanying claims, the following terms shall have the meanings indicated, unless the context otherwise requires.

As used herein, "photovoltaic material" refers to a material that generates an electrical current when exposed to light.

The term "removably coupled," when describing a first object coupled to a second object, means that the first object and second object may be decoupled from one another without damaging the first object or the second object. For example, a first object is removably coupled to a second object when the first object may be decoupled from the second object without cutting the first object from the second object. For example, a first object may be removably coupled to a second object by use of a set of fasteners (e.g., nuts and bolts; screws; clips, to name but a few examples), which fasteners may be removed by and and/or by using hand tools.

A "set" includes at least one member. For example, a "set" of solar panels may include as few as a single solar panel, or a plurality of solar panels.

The term "translate" with respect to a physical object means to move so that all of the objects part travel in the same direction, without rotation or change of shape As used herein, the term "solar system" refers to a power generating system that includes a solar array (i.e., a set of solar panels). In some embodiments, a "solar system" may also include a battery system, and/or a solar inverter. The terms, "solar system" and "photovoltaic system" can be used interchangeably.

As used herein, a "solar array" can refer to as set of one or more connected solar panels. The terms, "solar array" and "photovoltaic array" can be used interchangeably.

As used herein, a "solar panel" can refer to a sheet that has a photovoltaic material on at least one side. The terms "solar panel," and "photovoltaic panel," can be used interchangeably.

Aspects of the present disclosure address the above and other deficiencies by providing a retractable solar system that can include a frame, a photovoltaic array with a fixed solar panel coupled to the frame and moveable solar panels, and a movement mechanism operably coupled to the solar panels to move the moveable solar panels.

In illustrative embodiments, a movement mechanism operably coupled to a set of photovoltaic panels (e.g., a set of photovoltaic panels coupled to a corresponding sent of moveable petals) such that the movement mechanism is configured to controllably cause each photovoltaic panel (e.g., each moveable petal) to move, relative to a fixed portion of the frame, between a secured configuration and an exposed configuration.

For example, the solar panels can be moved into an open configuration (or "exposed" configuration) or a closed configuration (or "secured" configuration). A frame is configured to removably couple to a structure when the frame includes one or more features that allow it to be removably coupled to a structure. For example, in illustrative embodiments, a frame has a plurally of apertures, each aperture configured to receive a fastener to all such fastener to pass through the aperture and couple to the structure. In illustrative embodiments, such an aperture may be a circular aperture or rectangular aperture configured to allow a bolt or screw to pass through the aperture and removably couple to the structure.

In illustrative embodiments, when the solar panels are in the secured configuration, panel fasteners 561 that secure solar panels to the frame are not accessible from space external to the panel system in that the panel fasteners are enclosed or otherwise shielded by elements of the system in such a way that a potential thief cannot access the fasteners 561 so as to remove the fasteners 561 with a tool, or cut the fasteners off, so as to remove the solar panels from the frame. Alternatively, or in addition, in illustrative embodiments, when the solar panels are in the secured configuration, frame fasteners 551 that secure the frame to a supporting structure 102 are not accessible from space external to the panel system in that the frame fasteners 551 are enclosed or otherwise shielded by elements of the system in such a way that a potential thief cannot access the fasteners 551 so as to remove the fasteners 541 with a tool, or cut those fasteners off, so as to remove the frame from the supporting structure.

In some embodiments, in the closed configuration, the fixed solar panel is stored underneath the moveable solar panels. In some embodiments, in the closed configuration, the fixed solar panel sits above the moveable solar panels in a stacked configuration. In illustrative embodiments, a line normal to a solar panel in a stacked configuration would pass through the other solar panels in the stacked configuration.

When moved to the open configuration, the movable solar panels are repositioned to expose the fixed solar panel and each of the moveable to a light source. In some embodiments, when in the closed position, each solar panel (both fixed and moveable) can be secured and protected from the elements. In some embodiments, the solar system can additionally include an electrical sub-system with the circuitry to electrically couple the photovoltaic array to a desired electrical load. The electrical sub-system can additionally include an inverter sub-system and/or battery sub-system.

In some implementations, the solar system can include only the frame, with options to add solar panels. The frame can include fixtures to secure a fixed solar panel to the frame, and/or fixtures to secure a moveable solar panel to a movable portion of the frame. The frame can additionally include an electrical sub-system with the circuitry to electrically couple respective solar panels to a desired electrical load.

In illustrative embodiments, the frame defines an internal volume 140, and movable solar panels are retracted into, and disposed within, the internal volume when the system is in the secured configuration, so as to obscure the solar panels and/or panel fasteners, against access from space external to the internal volume.

Some implementations of the solar system include a retractable solar roof system (RSRS). In implementations, the RSRS can include a mechanism (or set of mechanisms) used to fold solar panels and the associated wires and circuitry into a compact footprint that matches an underlying base structure. Some examples of base structures can include kiosks and/or shipping containers. This framework allows the RSRS to stack efficiently during transportation and when not in use. In the closed and secured configuration, the RSRS can be disabled and/or locked. In some implementations, the RSRS can completely hide solar panels from external exposure. The RSRS can seamlessly open during the daytime to increase surface areas for higher solar energy production, and then seamlessly close during the nighttime for enhanced security.

Advantages of the present disclosure include, but are not limited to improved mobility, security (e.g., via the moveable panels), simple operation, and modularity when compared with permanent or semi-permanent solar panel arrays. The retractable solar system can be a portable, self-contained solar system that is easy to open for use, and easy to close securely during non-use. When the solar panels are retracted and in the closed position, the solar panels can be protected from damage, theft, and/or vandalism. By including multiple connected and retractable solar panels, the retractable solar system is a modular system. Improvements to the ease of securing the solar panels when not in use, and opening the retractable solar system to use the panels, makes deployment of the retractable solar system more viable, especially in remote or rural communities, on construction sites, or other similar power-limited environments. For example, some implementations can be used to provide solar power to schools in remote or rural communities that might lack reliable access to electricity. For example, the solar power can power computers for the teacher and/or students to use. As another example, some implementations can be used to support agricultural, construction, and/or healthcare activities in isolated environments. The retractable solar system can be configured to be attached to a variety of pre-existing structures (e.g., storage containers of varying sizes, as described in the following).

Figure 1B:
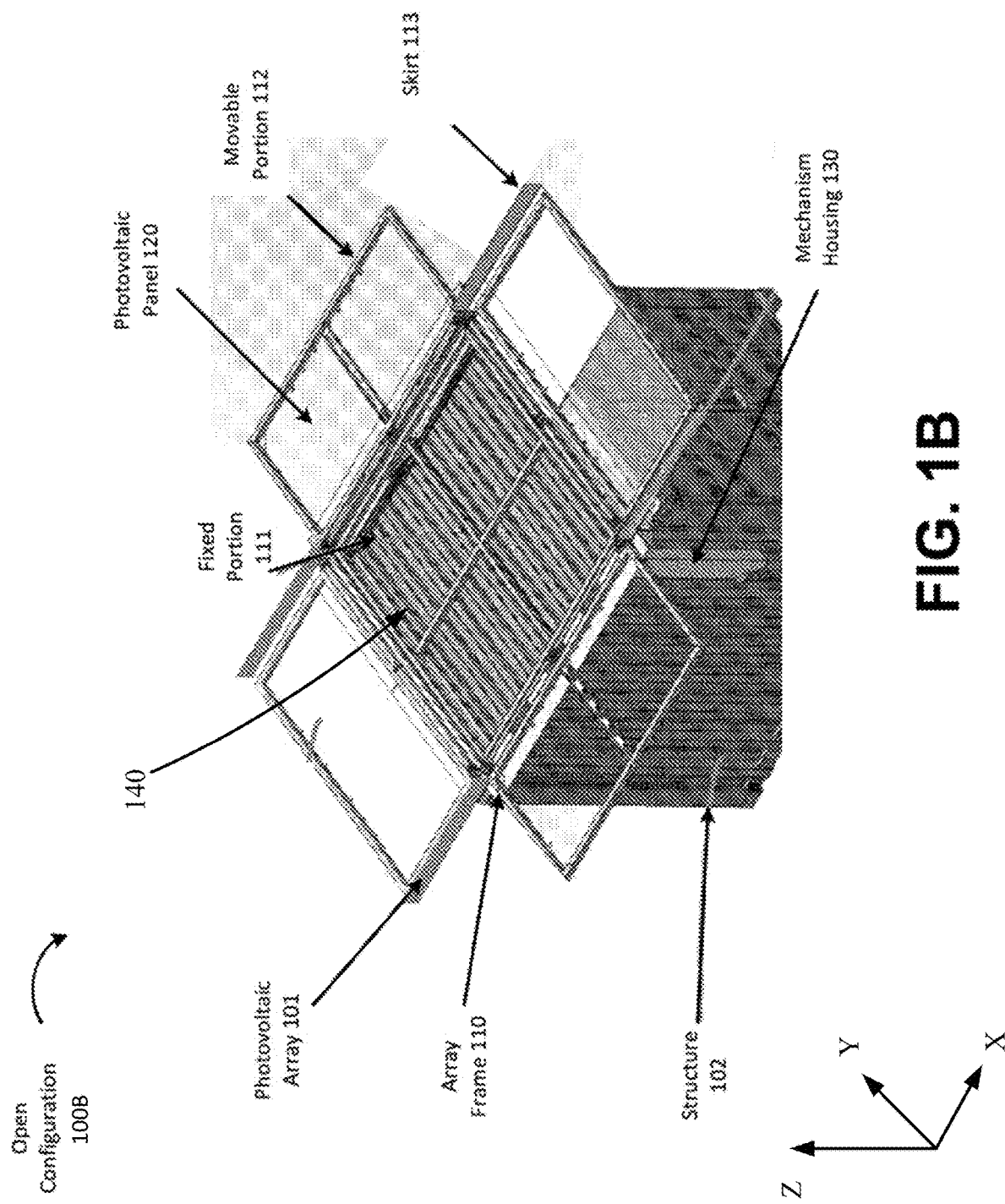
FIG. 1B schematically illustrates a photovoltaic array mounted to a structure in an open configuration, in accordance with embodiments of the present disclosure.

FIG. 1A illustrates a photovoltaic array 101 mounted to a structure 102 in a closed configuration 100A, in accordance with embodiments of the present disclosure. The photovoltaic array 101 can be configured to move between the closed configuration 100A and an open configuration 100B (as illustrated in FIG. 1B) when a moveable portion 112 pivots around a rotational axis. The moveable portions 112 are coupled to the frame via shafts and bearings. Two enclosed manual crank shafts (not shown) extend vertically downward from the roof system, on two sides, to allow for operations of opening and closing moveable portion 112. Flexible wire can be bonded to the photovoltaic array 101, fixed portion 111, and moveable portion 112 to ensure good electrical conductivity between the photovoltaic panels 120 and an electrical load.

The array frame 110 can be made of sheet metal with an integrated manual crank shaft driving mechanism (not shown) to open and close the photovoltaic array 101 (e.g., to move moveable portion 112). The crank shaft driving mechanism extends vertically against the side of structure 102, and is encased by mechanism housing 130. In some embodiments, there may be two crank shaft driving mechanisms to open and close photovoltaic array 101. Photovoltaic array 101 is configured to open and reveal five exposed surfaces (e.g., the surface of fixed portion 111, and the surface of each of the four moveable portions 112). In the illustrative embodiment of FIG. 1A, the array frame 110 is configured for the placement of six standard sized 500W solar panels (but can accommodate smaller panels in various combinations if desired), to provide a 3000W photovoltaic array 101. When in the closed configuration 100A, all cables, wires, and fasteners are concealed. In some embodiments, when in the closed configuration 100A, the surfaces of photovoltaic panels 120 are configured to not come in contact with other surfaces, and are protected when not in use.

In a particular embodiment, the photovoltaic array 101 is removably coupled to structure 102 weighs approximately 600 kilograms. Installation of photovoltaic panels 120 and related wiring can be accomplished at ground level, without need for ladders or scaffolding. Once in place, the array frame 110 with attached photovoltaic panels 120 can be mounted directly onto the four weight-bearing pillars of a standard shipping container roof. Except as described below, there is no drilling or any other work needed, except to lift system over the base/container, and hold it while the frame fasteners are fitted. In some embodiments, holes can be drilled in the pillars against which the system's winding crank shaft handle is mounted (not shown).

A structure 102 (e.g., shipping container) with coupled photovoltaic array 101 can be transported as a single unit. In some embodiments, photovoltaic panels 120, the array frame 110 and moveable portions 112, and the mechanism housing 130, can be placed inside shipping container during transportation. In some embodiments, the photovoltaic array 101 can be removed and transported separately without loss to the structural integrity of the structure 102. In some embodiments, multiple photovoltaic arrays 101 can be connected to one another to cover a roof of a larger (e.g., longer/wider, etc.) structure 102. In some embodiments, the movement mechanism in the array frame 110 and mechanism housing 130 can include automated, hydraulic, and/or electro-mechanical mechanisms to cause moveable portion 112 to move between the closed configuration 100A and the open configuration 100B. In some embodiments, the movement mechanism is configured to be manually powered, such as by a handle as described herein.

In the illustrative embodiment, structure 102 can be a shipping container, as shipping containers are known in the shipping arts, but embodiments are not limited to shipping containers. For example, photovoltaic array 101 can be mounted to a building, vehicle, kiosk, or other structure. The closed configuration 100A can also be referred to as a secured configuration or stored configuration. While in the closed configuration 100A, photovoltaic array 101 can be resistant to unwanted removal, theft, vandalism, and/or tampering. Photovoltaic array 101 can be attached to structure 102 by frame fasteners 550, such as frame fasteners 551 schematically illustrated in FIG. 5. In some embodiments, when in the secured configuration, the fasteners can be obscured such that the fasteners cannot be removed (e.g., the photovoltaic array 101 would need to move out of the closed configuration 100A for the fasteners to be removed). In some embodiments, temporary fasteners can be used to provide additional security to the photovoltaic array 101 in the closed configuration 100A. For example, locking mechanisms, latches, etc., can provide additional temporary restrictions on moving the photovoltaic array 101 out of the closed configuration 100A, and/or provide additional barriers to removing photovoltaic array 101 from structure 102.

While in the closed configuration, the photovoltaic array 101 is mechanically disadvantaged from being opened without engaging the movement mechanism (not shown). A portion of the movement mechanism can be covered by mechanism housing 130. Mechanism housing 130 can provide protection to a portion of the movement mechanism against theft, vandalism, and/or damage. While in the closed configuration 100A, a portion of the movement mechanism (e.g., a handle) can be removed, which can disengage the movement mechanism (e.g., prevent the movement mechanism from being used). In some embodiments, temporary fasteners (e.g., locks) can provide additional security to prevent the movement mechanism from being engaged. Additional details regarding the movement mechanism are described below with respect to FIGS. 3A-6B.

Figure 2A:
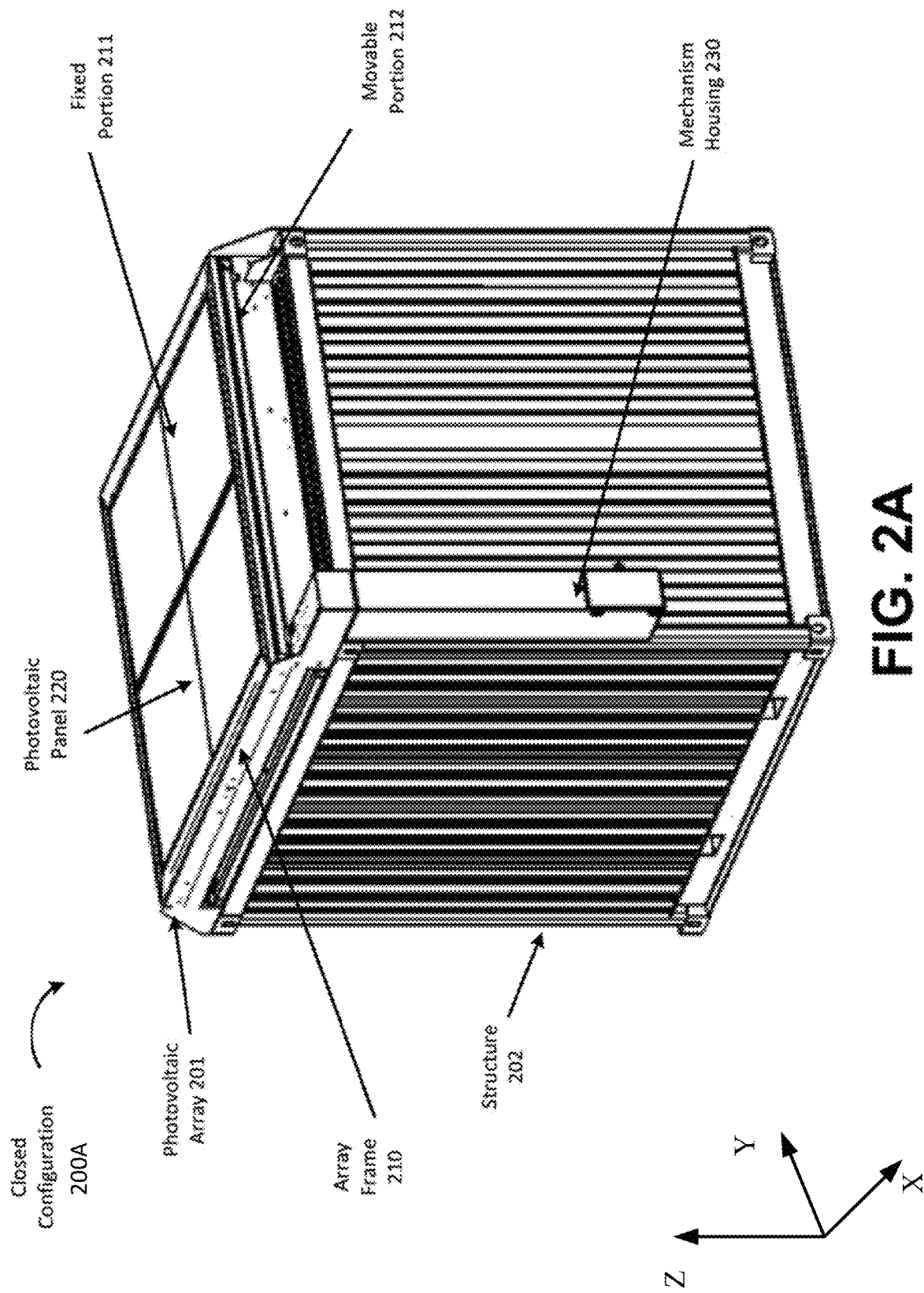
FIG. 2A schematically illustrates a photovoltaic array mounted to a structure in a closed configuration, in accordance with embodiments of the present disclosure.

Photovoltaic array 101 can include an array frame 110 and a set of one or more photovoltaic panels 120. In many embodiments, photovoltaic array 101 can include multiple photovoltaic panels 120. In illustrative embodiments, an array frame (110; 210) defines a frame plane, which in FIG. 1A and FIG. 2A is a plane parallel to the illustrated X-Y plane. The array frame (110; 210) is configured to rest on a structure (102; 202) with the frame plane parallel to a surface of the structure on which the array frame rests. In illustrative embodiments, the array frame 110 defines an internal volume, which internal volume is distinct from space outside of the frame.

Array frame 110 can include fixed portion 111 (e.g., a first portion) and a set of moveable portions 112 (e.g., each movable portion may be referred-to as a second portions, or a "petal"), wherein each moveable portion 112 is controllable moveable relative to the fixed portion 111.

The array frame 110 can have attachment points for photovoltaic panels. In some embodiments, each photovoltaic panel 120 is removably coupled to a corresponding portion of the frame 110 (e.g., a movable portion 112) by a corresponding set 560 of one or more photovoltaic panel fasteners, such as fasteners 561 schematically illustrated in FIG. 5.

Fixed portion 111 can be an attachment point for a fixed photovoltaic panel to attach to array frame 110. Moveable portion 112 can be an attachment point for a movable photovoltaic panel to attach to array frame 110.

The moveable portion 112 can be attached to the array frame 110 at pivot points such that the moveable portion 112 can rotate around the pivot points. When in the closed configuration 100A, photovoltaic panels 120 can be stacked relative to one another. The face of with photovoltaic materials of the photovoltaic panels 120 attached to the moveable portion 112 can face towards the structure 102 when in the closed configuration 100A. Photovoltaic materials can include, for example, materials that generate a charge when exposed to a light source. In some embodiments, moveable portion 112 can include a backing portion that rests against a back face (e.g., the face without photovoltaic materials) of an attached photovoltaic panel 120. The backing portion of the moveable portion 112 can provide structural rigidity to the attached photovoltaic panel 120 and protection against damage to the photovoltaic panel 120.

FIG. 1B illustrates a photovoltaic array 101 mounted to a structure 102 in an open configuration 100B, in accordance with embodiments of the present disclosure. The photovoltaic array 101 can be configured to move between the closed configuration 100A and an open configuration 100B when a moveable portion 112 pivots around a rotational axis. The moveable portions 112 may be coupled to the frame via shafts and bearings. Two enclosed manual crank shafts (not shown) extend vertically downward from the roof system, on two sides, to allow for operations of opening and closing moveable portion 112. Flexible wire can be bonded to the photovoltaic array 101, fixed portion 111, and moveable portion 112 to ensure good electrical conductivity between the photovoltaic panels 120 and an electrical load.

The open configuration 100B can also be referred to as an operational configuration. While in the open configuration 100B, photovoltaic array 101 can be used to generate electricity using photovoltaic materials on one face of photovoltaic panels 120 that generate a charge in response to light. In some embodiments, electrical connections (e.g., cables, inverters, batteries, etc.) can be self-contained within the photovoltaic array 101 and the structure 102, such that photovoltaic array 101 will function as soon as light is permitted to shine on face of the photovoltaic panel 120 having the photovoltaic material. Electrical cabling can be routed along portions of a moveable photovoltaic panel 120 (e.g., along a portion of moveable portion 112) such that the electrical cabling does not inhibit the movement of moveable portion 112.

In some embodiments, large cabling links known as "drag chains" can be used to effectively route electrical cabling. Drag chains resemble oversized links in a chain linkage with a hollowed area in each link, such that as a linkage, a hollow passageway runs the length of the chain linkage. The electrical cables running along the hollow drag chain linkage are free to bend along the path of the chain linkage, while staying protected by the outer portions of the drag chain. In some embodiments, a solar inverter system (not shown) can be electrically coupled to photovoltaic array 101 by the electrical cables. In some embodiments, the solar inverter system can be connected to a battery system (not shown) configured to store electricity generated by photovoltaic array 101. In some embodiments, the solar inverter system can be housed within the structure 102. In some embodiments, the battery system can be housed within the structure 102. In embodiments with an inverter system and/or battery system, a false wall within the structure 102 can conceal the inverter system and/or battery system from plain view. The false wall can provide additional security to the inverter system and/or battery system against theft, vandalism, and/or damage. In some embodiments, an active or passive cooling system can be thermally coupled to the inverter system and/or battery system to improve the electrical efficiency of either (or both) system.

While in the open configuration 100B, the photovoltaic array 101 is mechanically disadvantaged from being closed without engaging the movement mechanism (130; 230). A portion of the movement mechanism can be covered by mechanism housing 130. Mechanism housing 130 can provide protection to a portion of the movement mechanism against theft, vandalism, and/or damage. In some embodiments, a portion of the mechanism housing can be enclosed in the structure 102. While in the open configuration 100B, a portion of the movement mechanism (e.g., a handle) can be removed, which can disengage the movement mechanism (e.g., prevent the movement mechanism from being used). In some embodiments, temporary fasteners (e.g., locks) can provide additional security to prevent the movement mechanism from being engaged. Additional details regarding the movement mechanism are described below with respect to FIGS. 3A-6B. In some embodiments, temporary fasteners can be used to provide additional security to the photovoltaic array 101 in the open configuration 100B. For example, locking mechanisms, latches, etc. can provide additional temporary restrictions on moving the photovoltaic array 101 out of the open configuration 100B, or provide additional barriers to removing photovoltaic array 101 from structure 102.

Moveable portion 112 can include a skirt 113. The skirt 113 extends from the moveable portion in a direction such that the skirt extends towards the structure 102 when the moveable portion 112 is in the closed configuration 100A. In the open configuration 100B, the skirt 113 extends away from the structure 102. In the closed configuration 100A, the skirt can impede or prevent access to photovoltaic panels 120. One or more skirts 113 attached to moveable portions 112 can form a complete perimeter around the moveable portions 112 in the closed configuration 100A.

Figure 1C:
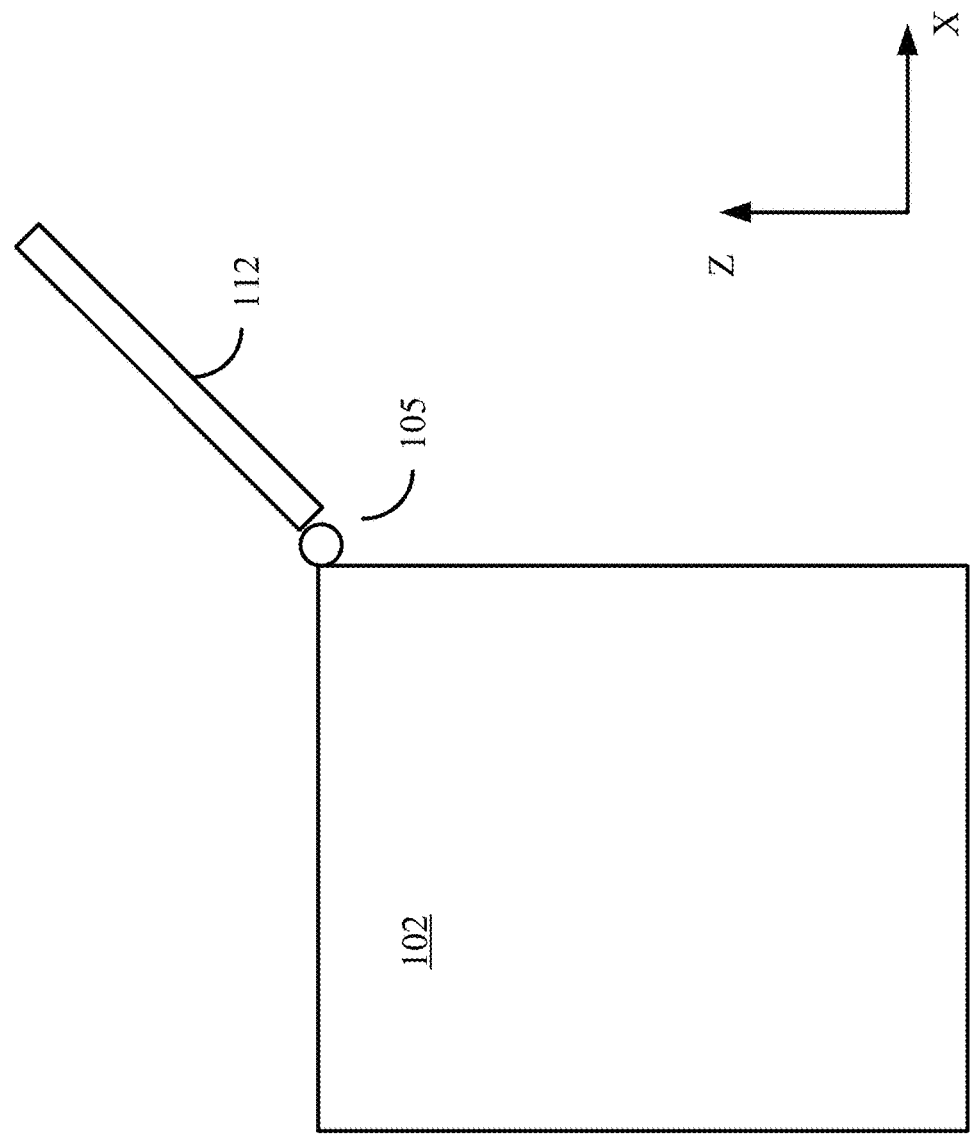
FIG. 1C schematically illustrates a panel (or petal) rotatably coupled to a base.

FIG. 1C schematically illustrates a movable portion 112 (e.g., a petal) rotatably coupled to a supporting structure 102. In this embodiment, movable portion 112 is coupled to the supporting structure by a rod or hinge 105. The array frame 110 may define an array plane (e.g., the X-Y plane in FIG. 1B), and in an open configuration and in a closed configuration each movable portion (e.g., each petal; each photovoltaic panel) rests within the array plane or a plane parallel to the array plane.

In motion from an open position to a closed position, the movable portion 112 rotates (or pivots) around the rod or hinge 105 (in the Y-axis) such that the panel moves from an initial position in the X-Y plane, then out of the array plane, and eventually comes to rest (e.g., above the supporting structure) in the X-Y plane, as schematically illustrated in FIG. 1A.

In motion from a closed position to an open position, the movable portion 112 rotates (or pivots) around the rod or hinge 105 (in the Y-axis) such that the panel moves from an initial position in the X-Y plane (e.g., above the supporting structure), then out of the array plane, and eventually comes to rest in the X-Y plane, as schematically illustrated in FIG. 1B.

Figure 2B:
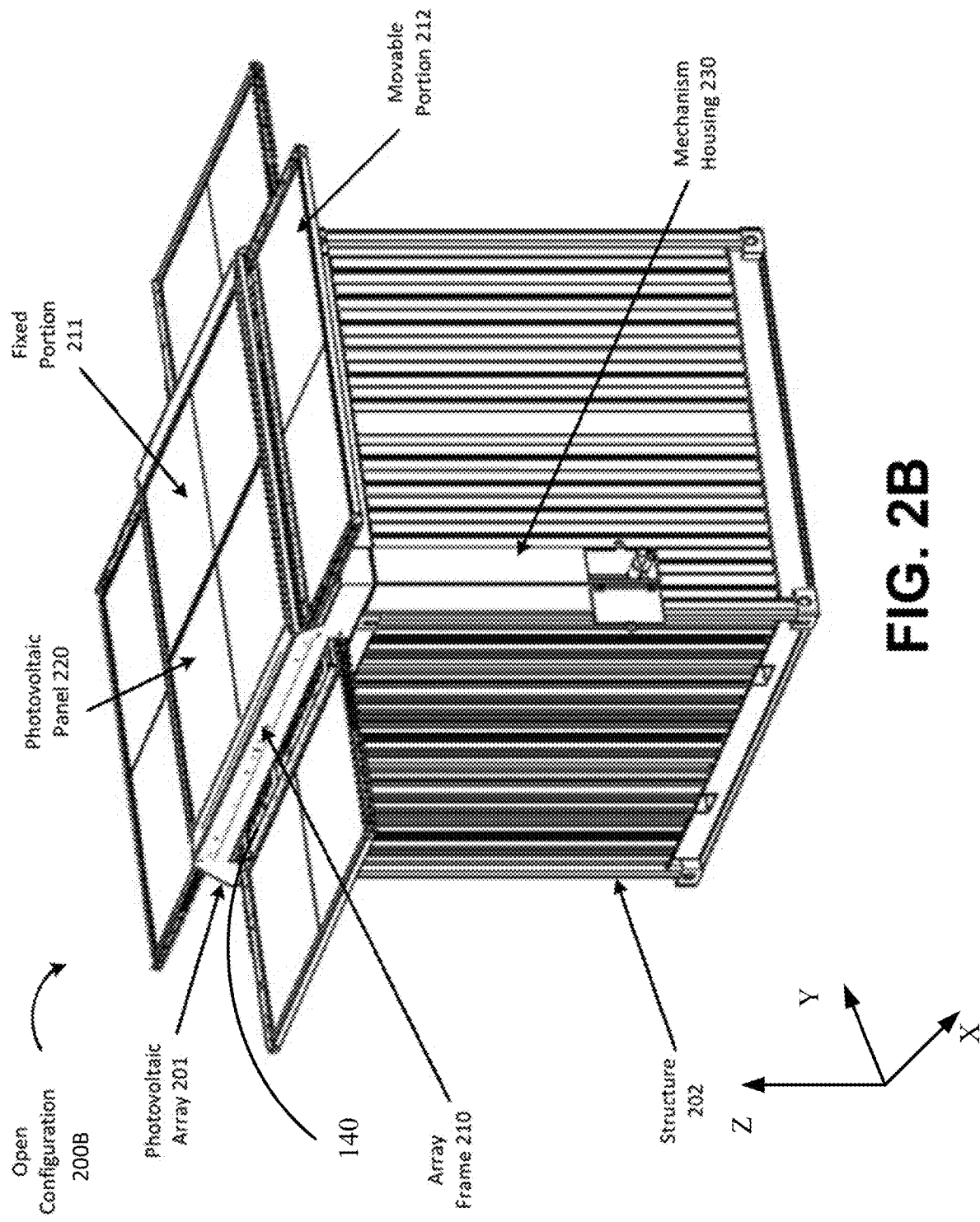
FIG. 2B schematically illustrates a photovoltaic array mounted to a structure in an open configuration, in accordance with embodiments of the present disclosure.

FIG. 2A illustrates a photovoltaic array 201 mounted to a structure 202 in a closed configuration 200A, in accordance with embodiments of the present disclosure. The photovoltaic array 201 can be configured to move between the closed configuration 200A and an open configuration (e.g., as illustrated in FIG. 2B) when a moveable portion 212 slides along a linear path (e.g., along rails). In such embodiments, the fixed portion 210 of the frame defines a frame plane, and each petal of the set of petals is movably coupled to the fixed portion of the frame by a rail and is configured to move along a path of the rail so as to translate in a plane parallel to the frame plane. In such embodiments, one or more movable portions 212 may be described as being slidably coupled to the array frame 210. The array frame 210 may define an array plane (e.g., the X-Y plane in FIG. 2B), and in motion, from an open configuration to a closed configuration, and from a closed configuration to an open configuration, one or more movable portions 212 move within, or parallel to, the array place, without rotating out of the array plane.

When in the open configuration, moveable portion 212 can be extended out from the array frame 210 on linear rails or slides. When in the closed configuration 200A and in the open configuration 200B, a top surface of the moveable panel 212 and corresponding top surface of the photovoltaic panel 220 are configured to face away from the structure 202. The top surface of the photovoltaic panel 220 includes photovoltaic material.

When in the closed configuration 200A and when in the open configuration 200B, a bottom surface of the moveable panel 212 and corresponding bottom surface of the photovoltaic panel are configured to face towards the structure 202.

As described above with respect to closed configuration 100A, the closed configuration 200A can also be referred to as a secured configuration or stored configuration. While in the closed configuration 200A, photovoltaic array 201 can be resistant to removal, theft, and/or tampering. Photovoltaic array 201 can be attached to structure 202 by a set of fasteners 550. In some embodiments, when in the secured configuration, the fasteners can be obscured such that the fasteners cannot be removed (e.g., the photovoltaic array 201 would need to move out of the closed configuration 200A for the fasteners to be removed).

In some embodiments, temporary fasteners can be used to provide additional security to the photovoltaic array 201 in the closed configuration 200A. For example, locking mechanisms, latches, etc. can provide additional temporary restrictions on sliding the photovoltaic array 201 out of the closed configuration 200A, or provide additional barriers to removing photovoltaic array 201 from structure 202.

Moveable portions 212 can slide out from gaps in array frame 210. In some embodiments, when moveable portions 212 are stowed (e.g., in the closed configuration 200A), protective flaps (not shown) can cover the gaps for moveable portions 212. Adjacent moveable portions 212 (e.g., moveable portions on adjacent sides of array frame 210) can be staggered vertically such that moveable portions 212 can open and close (i.e., slide out of and into the frame 210) without interference. In the illustrative embodiment, moveable portions 212 that are 180 degrees apart (e.g., on opposite sides of the array frame 210) can be at the same vertical location on the array frame 210. Thus, in the illustrative embodiment, two sets of moveable portions 212 (e.g., two sets of moveable portions on opposite sides of array frame 210) are each at different vertical heights on array frame 210. In some embodiments, temporary fasteners (e.g., locks) can prevent moveable portions 212 from extending from the closed configuration 200A, and/or prevent moveable portions 212 from moving out of the open configuration 200B.

Array frame 210 can include fixed portion 211 (e.g., a first portion) and moveable portion 212 (e.g., a second portion). Fixed portion 211 can be an attachment point for a fixed photovoltaic panel to attach to array frame 210. Moveable portion 212 can be slidably coupled to the array frame 210 by rails that allow the photovoltaic panel 220 to slide back and forth. When in the closed configuration 200A, photovoltaic panels 220 can be stacked relative to one another. The face of with photovoltaic materials (e.g., materials that generate a charge when exposed to a light source) of photovoltaic panels 220 attached to the moveable portion 212 can face away from the structure 202 when in the closed configuration 200A. In some embodiments, moveable portion 212 can include a backing portion that rests against a back face (e.g., the face without photovoltaic materials) of an attached photovoltaic panel 220. The backing portion of the moveable portion 212 can provide structural rigidity to the attached photovoltaic panel 220 and protection against damage to the photovoltaic panel 220.

FIG. 2B illustrates a photovoltaic array 201 mounted to a structure 202 in an open configuration 200B, in accordance with embodiments of the present disclosure. The photovoltaic array 201 can be configured to move between the closed configuration 200A and an open configuration (e.g., as illustrated in FIG. 2B) when a moveable portion 212 slides along a linear path (e.g., along rails). When in the open configuration, moveable portion 212 can be extended out from the array frame 210 on linear rails or slides. When in the closed configuration 200A and in the open configuration 200B, a top surface of the moveable panel 212 and corresponding top surface of the photovoltaic panel 220 are configured to face away from the structure 202. The top surface of the photovoltaic panel 220 includes photovoltaic material. When in the closed configuration 200A and when in the open configuration 200B, a bottom surface of the moveable panel 212 and corresponding bottom surface of the photovoltaic panel are configured to face towards the structure 202.

The open configuration 200B can also be referred to as an operational configuration. While in the open configuration 200B, photovoltaic array 201 can be used to generate electricity using photovoltaic materials on one face of photovoltaic panels 220 that generate a charge in response to light. As described above with respect to FIG. 1B, electrical connections (e.g., cables, inverter systems, battery systems, drag chains, etc.) can be self-contained within the photovoltaic array 201 and the structure 202. While in the open configuration 200B, the photovoltaic array 201 is mechanically disadvantaged from being slid closed without engaging the movement mechanism (not shown). In some embodiments, while in the open configuration 200B, moveable portion 212 can be configured to rotate with respect to array frame 210. In some embodiments, moveable portion 212 can include one or more brackets (not shown) that fold down from moveable portion 212 to provide additional support to moveable portion 212 while in the open configuration 200B.

Figure 3:
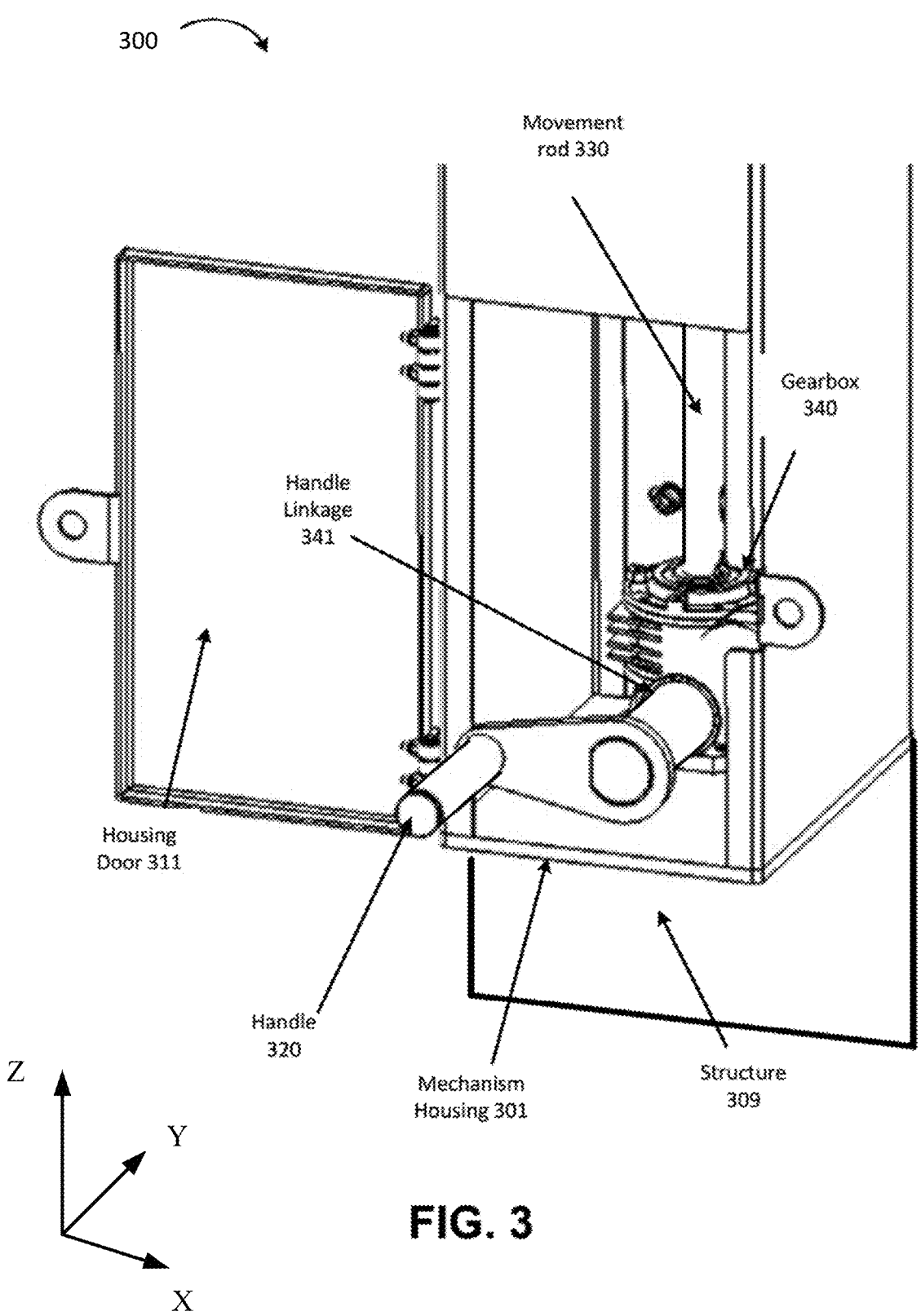
FIG. 3 schematically illustrates a portion of the movement mechanism in a coupled handle configuration, in accordance with embodiments of the present disclosure.

FIG. 3 illustrates a portion of the movement mechanism in a coupled handle configuration 300, in accordance with embodiments of the present disclosure. Mechanism housing 301 can removably couple to structure 309. Mechanism housing 301 can protect handle 320, handle linkage 341, movement rod 330 (part of the movement mechanism), and gearbox 340 from damage or vandalism. Mechanism housing 301 can include a housing door 311. Housing door 311 can be closed when handle 320 is not in use. In some embodiments, housing door 311 and mechanism housing 301 can include a latch or locking mechanism. For example, housing door 311 can include a hole and mechanism housing 301 can include a matching hole such that when housing door 311 is closed the holes align. The aligned holes in housing door 311 and mechanism housing 301 can be coupled with a lock, such as a padlock or combination lock to prevent tampering, theft, or vandalism of the handle 320, movement rod 330, and/or gearbox 340. Movement rod 330 and gearbox 340 can be permanently coupled to mechanism housing 301. In some embodiments, movement rod 330 and gearbox 340 are removably coupled to mechanism housing 301, but can only be uncoupled from mechanism housing 301 after the mechanism housing 301 is decoupled from the structure 309.

Handle 320 can mechanically couple to the movement rod 330 via gearbox 340. Handle 320 can be configured to removably couple to gearbox 340 via handle linkage 341. Handle linkage 341 can be a permanent portion of gearbox 340. In some embodiments, handle linkage 341 can be removably coupled to gearbox 341. In some embodiments, handle linkage 341 can include a hinged portion which allows handle 320 to fold up from an operational configuration (e.g., as illustratively shown) to a non-operational configuration (e.g., a folded configuration). In the folded configuration, handle 320 can fit within mechanism housing 301 such that when housing door 311 is closed, mechanism housing 301 fully encloses handle 320, handle linkage 341, movement rod 330 and gearbox 340. In some embodiments, handle linkage 341 can include a cavity or aperture configured to accept an extruded portion of handle 320 such that handle 320 can transfer rotational energy (e.g., torque) to handle linkage 341. In some embodiments, the cavity or aperture of handle linkage 341 and the extruded portion of handle 320 can have a similar particular shape of differing physical dimensions (e.g., differing physical measurements). Similarly, in some embodiments, handle 320 can include the cavity or aperture, and handle linkage 341 can include the extrusion. Additional related removable couplings between handle 320 and handle linkage 341 are considered. In embodiments where handle 320 is removably coupled to handle linkage 341, handle 320 can be decoupled from handle linkage 341 without first decoupling the mechanism housing 301 from structure 309.

When handle 320 is decoupled from handle linkage 341, the movement rod 330 (and connected movement mechanism) can be mechanically disadvantaged from moving. In some embodiments, handle 320 can be decoupled (not shown) from the movement rod 330 to prevent the movement mechanism from engaging (e.g., to prevent the movement mechanism from opening the photovoltaic array from a closed configuration or closing the photovoltaic array from an open configuration). In some embodiments, when handle 320 is folded into the mechanism housing 301, the movement mechanism can be inhibited from engaging (e.g., the photovoltaic array will resist opening from a closed configuration or closing from an open configuration). In some embodiments, when handle 320 is folded into the mechanism housing 301, the folded handle 320 can act as a lever against an internal sidewall of the mechanism housing to prevent the movement rod from rotating.

When rotated, handle 320 can cause movement rod 330 to rotate. Movement rod 330 can be made from a rigid material that efficiently transfers rotational energy (e.g., torque), such as metal. Handle 320 is configured to rotate around a first axis. The first axis can be defined by gearbox 340 mechanically coupled to handle 320 through handle linkage 341. Gearbox 340 can convert rotations of handle 320 from a first axis of rotation to a second axis of rotation. Movement rod 330 can mechanically couple to gearbox 340 such that movement rod 330 is configured to rotate around a second axis. Thus, in a mechanical sub-system including handle 320, movement rod 330, and gearbox 340, rotations of handle 320 with respect to a first rotational axis are configured to cause rotations of movement rod 330 with respect to a second rotational axis, made possible by gearbox 340. In the illustrative example, the second axis of rotation is perpendicular, or substantially perpendicular to the first axis of rotation. However, gearbox 340 is capable of producing non-perpendicular angles of incidence between the first axis of rotation and the second axis of rotation. Gearbox 340 can include gears such as worm gears, bevel gears, or other types of gears configured to transfer rotational energy from a first axis of rotation to a second axis of rotation. As described above, in some embodiments, a portion of gearbox 340 can include handle linkage 341.

Figure 4:
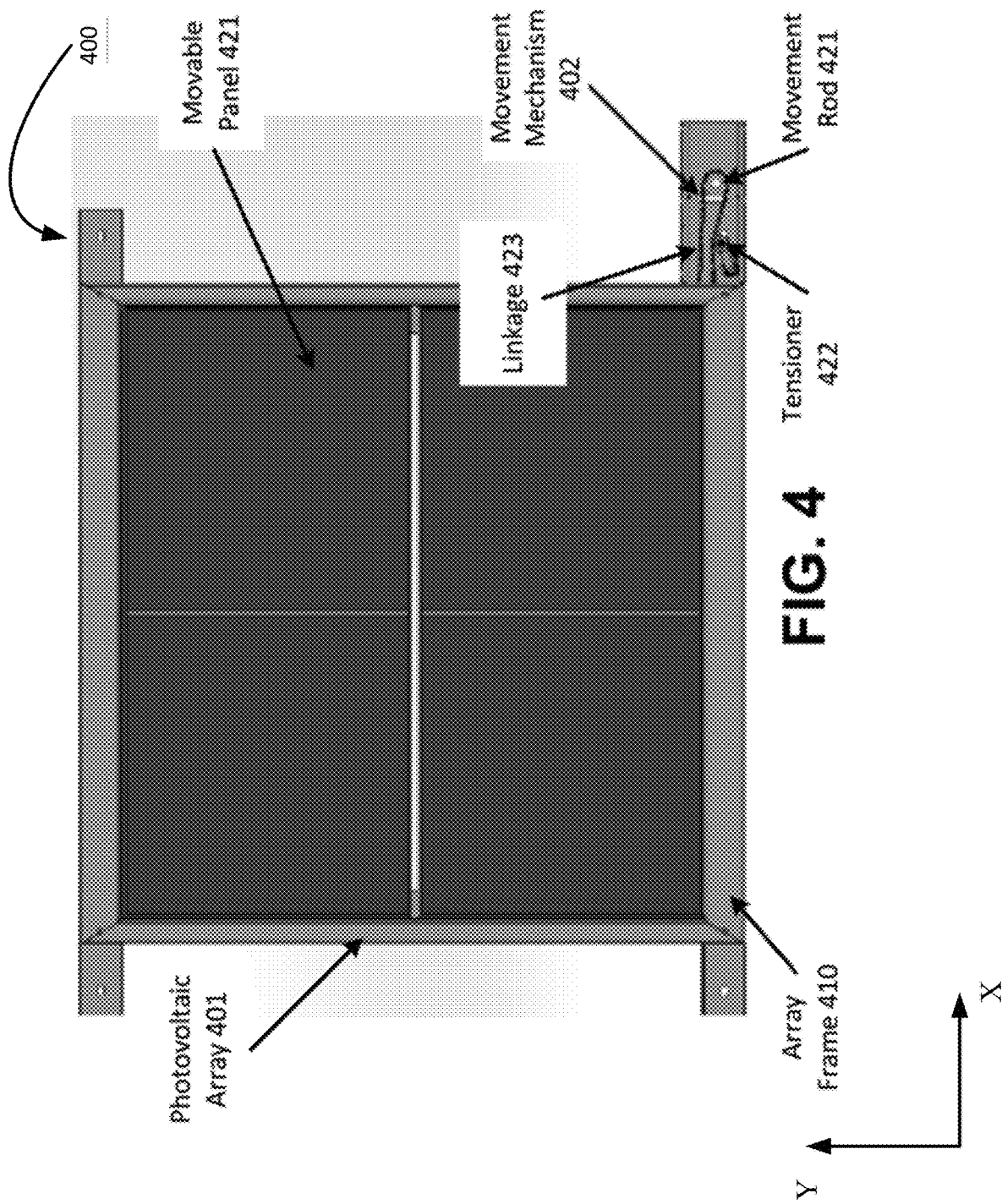
FIG. 4 schematically illustrates a top view of a portion of photovoltaic array in a closed configuration, in accordance with embodiments of the present disclosure.

FIG. 4 illustrates a top view of a portion of photovoltaic array 401 in a closed configuration in accordance with embodiments of the present disclosure. The closed configuration illustrated in FIG. 4 can be the same as, or similar to, the closed configuration 200A of FIG. 2A. The photovoltaic array 401 includes movement mechanism 402, array frame 410, and moveable panel 411. Movement mechanism 402 can include movement rod 421 and tensioner 422. Movement mechanism 402 can be engaged by movement rod 421. Movement rod 421 can be a movement rod 330 as described above with respect to FIG. 3. When movement rod 421 is rotated (e.g., by a handle such as handle 320 of FIG. 3), linkage 423 in movement mechanism 402 can be engaged to cause moveable panel 420 to move. Tensioner 422 can reduce slack that might be present in linkage 423 so that linkage 423 does not slip off of gears (not shown) within movement mechanism 402. Tensioner 422 can provide tension to linkage 423 to improve the mechanical coupling between linkage 423 and movement rod 421. In some embodiments, tensioner 422 can be adjustable. In some embodiments, tensioner 422 can be spring-loaded. In some embodiments, tensioner 422 can be rigid. Moveable panel 420 can be moveably coupled to array frame 410, and can be configured to move when movement mechanism 402 is engaged. In some embodiments, moveable panel 420 can rotate with respect to array frame 410 when movement mechanism 402 is engaged. In some embodiments, moveable panel 420 can slide laterally (e.g., move on rails along a linear path) with respect to array frame 410 when movement mechanism 402 is engaged.

In some embodiments, movement mechanism 402 can include a spool or pulley (not shown) that guides electrical wiring coupled to the photovoltaic moveable panel 421 as it moves between the closed configuration (e.g., closed configuration 200A) and open configuration (e.g., open configuration 200B).

FIG. 5 illustrates a close-up view 500 of a portion of the movement mechanism 502 in photovoltaic array 501, in accordance with embodiments of the present disclosure. Movement mechanism 502 includes first linkage 521, second linkage 522, handle linkage 523, and linkage fittings 525. First linkage 521 can couple to a photovoltaic panel such as photovoltaic panel 120 described with respect to FIG. 1A. Second linkage 522 can couple to a photovoltaic panel such as photovoltaic panel 120. First linkage 521 can mechanically couple to second linkage 522 and handle linkage 523 with linkage fittings 525. In some embodiments, first linkage 521 and second linkage 522 can be one continuous linkage. In some embodiments, movement mechanism can contain a third and fourth linkage respectively (not shown).

The handle (e.g., handle 320) is coupled to one end of a rod (e.g., movement rod 330, 421). The opposite end of movement rod 330 mechanically couples with handle linkage 523. Handle 320 rotates which (through gearbox 340) causes one end of movement rod 330 to rotate. The other end of movement rod 330 is mechanically coupled to linkage fitting 525 by handle linkage 523. Linkage fitting 525 is configured to rotate about a first rotational axis when movement rod 330 is rotated about a second rotational axis. In many embodiments, the second rotational axis of the movement rod 330 is a translated (e.g., linearly shifted) first rotational axis of the linkage fitting 525 (e.g., objects that rotate around the first rotational axis and objects that rotate around the second rotational axis are on the same plane). First linkage 521 is mechanically coupled to linkage fitting 525 such that first linkage 521 moves when linkage fitting 525 is rotated. Thus, in a mechanical sub-system including handle 320, movement rod 330, handle linkage 523, linkage fittings 525, and first linkage 521, a rotation of handle 320 about a first axis causes (through mechanical coupling) first linkage 521 to rotate with respect to a second rotational axis.

As described above, photovoltaic panels (e.g., photovoltaic panel 120) can be configured to move when the movement mechanism 502 is engaged. First linkage 521 and second linkage 522 can be mechanically coupled to a photovoltaic panel such that the coupled photovoltaic panel moves when first linkage 521 and/or second linkage 522 moves. The movement mechanism that causes the photovoltaic panels 120 to move is further described below with respect to FIGS. 6A-B.

Figure 6A:
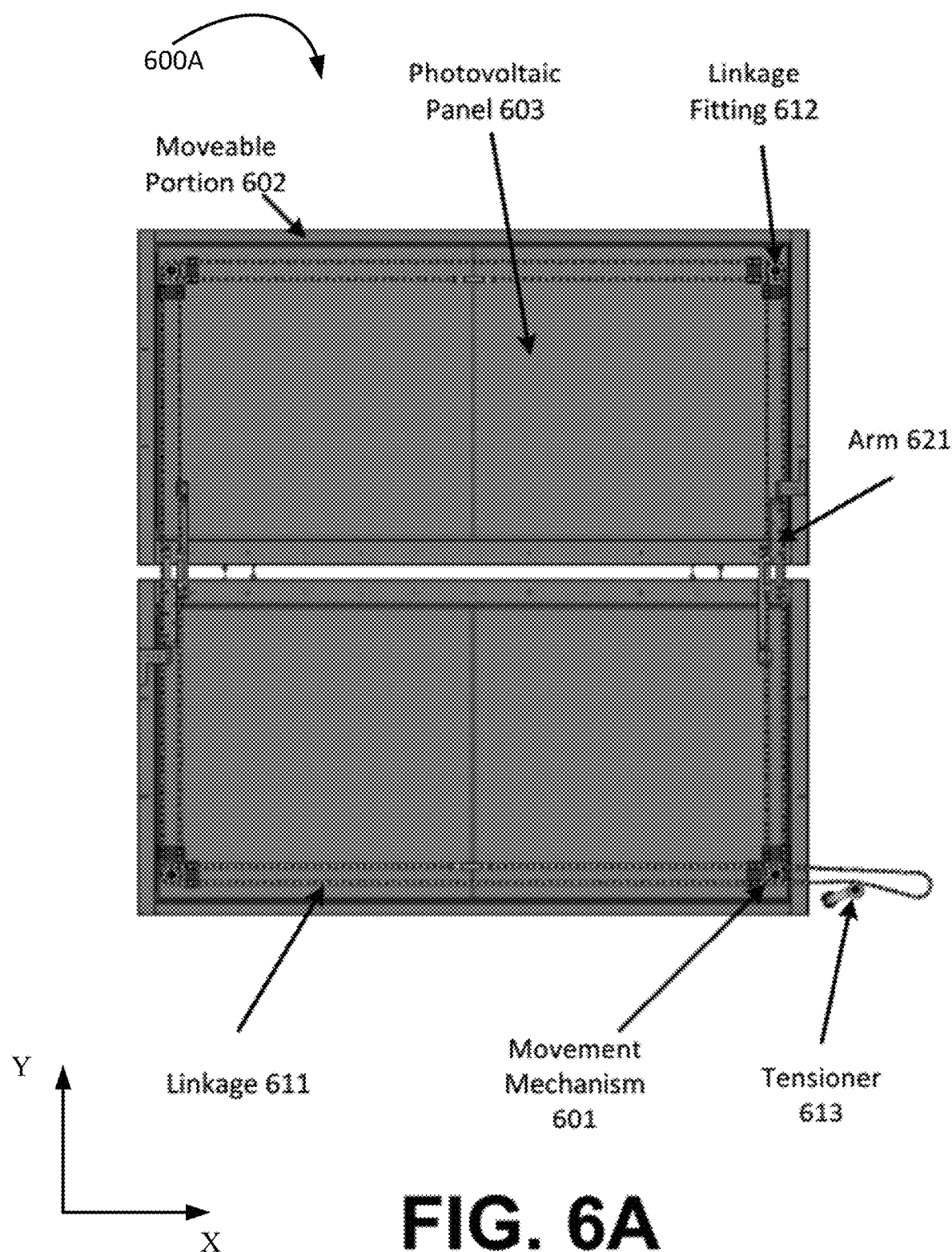
FIG. 6A schematically illustrates an embodiment of photovoltaic array, in accordance with embodiments of the present disclosure.

FIG. 6A illustrates an embodiment of photovoltaic array 600A, in accordance with embodiments of the present disclosure. Photovoltaic array 600A includes movement mechanism 601, moveable portion 602, and photovoltaic panel 603. Movement mechanism 601 is configured to cause moveable portion 602 to move between various configurations (e.g., between a closed configuration 200A and an open configuration 200B). Moveable portion 602 is mechanically coupled to movement mechanism 601 at various points.

Movement mechanism 601 includes linkage 611, linkage fittings 612, and tensioner 613. Moveable portion 602 can be mechanically coupled to linkage 611. Linkage 611 can include multiple portions (e.g., a first portion, second portion, third portion, and fourth portion each corresponding to one side of the photovoltaic array 600). Linkage 611 can be configured to move along a predefined closed-loop path in response to rotational energy. The predefined closed-loop path can be defined by linkage fittings 612 (e.g., linkage fittings 525 as described with respect to FIG. 5). In the illustrative example, there are linkage fittings 612 located in each of the four corners of photovoltaic array 600. Four portions of linkage 611 each travel a closed-loop path pre-defined by a pair of linkage fittings 612 located in respective adjacent corners of photovoltaic array 600. Each portion of linkage 611 can connect to a respective moveable portion 602 of photovoltaic array 600. Moveable portion 602 includes arm 621 that facilitates movement of the moveable portion 602 when movement mechanism 601 is engaged. Arm 621 is mechanically coupled to linkage 611 such that when movement mechanism 601 is engaged, linkage 611 moves, and exerts a lateral force on arm 621 which causes moveable portion 602 to move. In some embodiments, the lateral force applied to arm 621 by engaging movement mechanism 601 can cause moveable portion 602 to rotate (e.g., at a pivot point or with a hinge) with respect to photovoltaic array 600. In some embodiments, the lateral force applied to arm 621 by engaging movement mechanism 601 can cause moveable portion 602 to slide along a linear path (e.g., along rails) with respect to photovoltaic array 600. In some embodiments, movement mechanism 601 can include additional components to facilitate movement of moveable portion 602. For example, steel cables (not shown) can be used in conjunction with, or in place of arm 621 to translate the lateral force from linkage 611 to moveable portion 602.

Figure 6B:
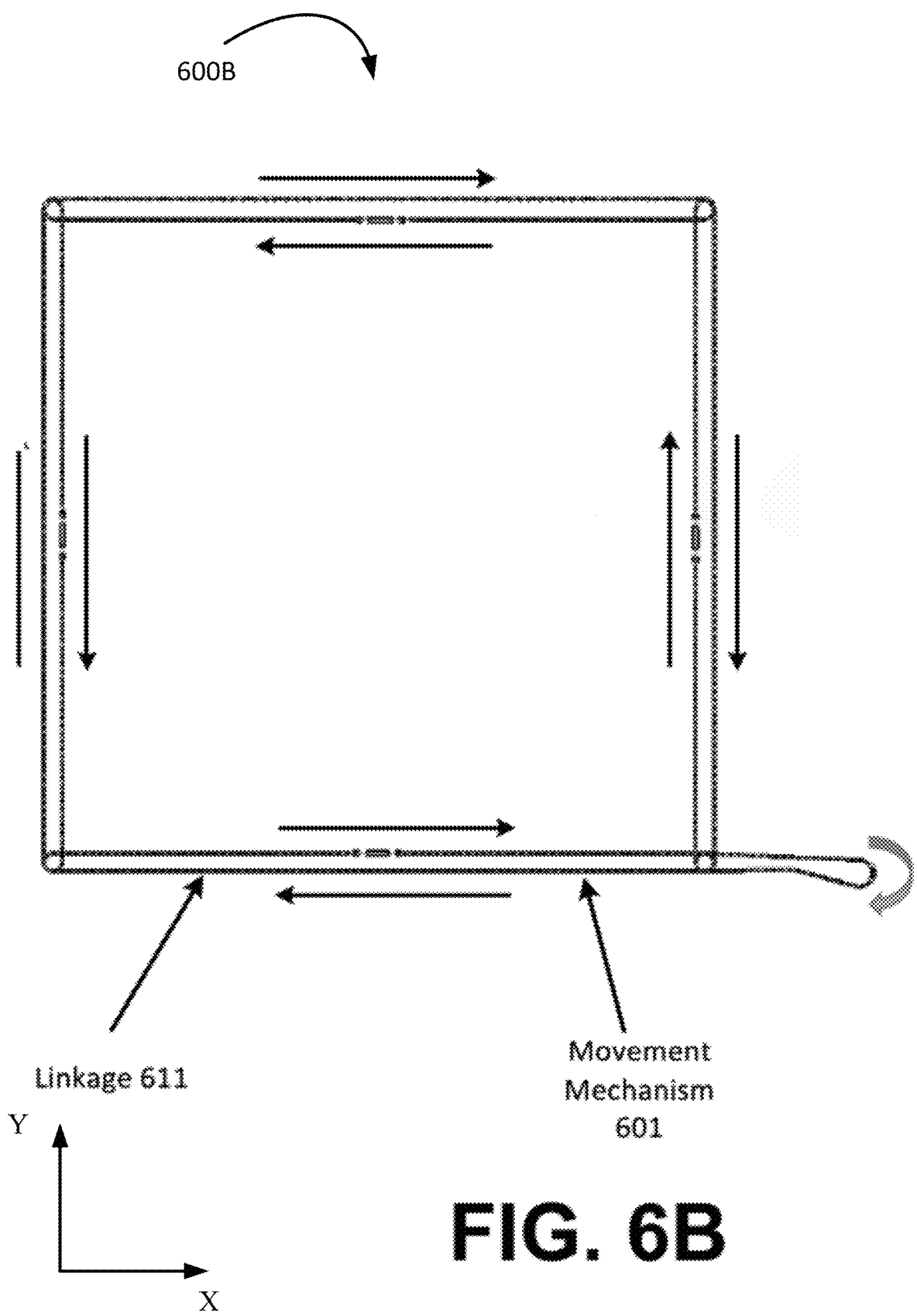
FIG. 6B schematically illustrates an embodiment of a portion of movement mechanism, in accordance with embodiments of the present disclosure.

FIG. 6B illustrates an embodiment 600B of a portion of movement mechanism 601, in accordance with embodiments of the present disclosure. Linkage 611 is configured to move as shown in the illustrative example. Linkage 611 can include multiple portions (e.g., a first portion, second portion, third portion, and fourth portion each corresponding to one side of the rectangular frame). Each of the portions of linkage 611 can be mechanically coupled together, e.g., such that a force causing one portion to move causes all portions to move in concert.

In some embodiments, each portion of linkage 611 can be configured to travel along a respective predefined closed loop path. In some embodiments, the closed-loop path can be defined by two or more linkage fittings (e.g., linkage fittings 525 described with respect to FIG. 5). Each portion of linkage 611 can be configured to move along the closed-loop path in the same direction (e.g., all portions can move clockwise along respective pre-defined paths or all can move counter-clockwise along respective pre-defined paths).

Linkage 611 and/or portions of linkage 611 can be connected to corresponding moveable portions of the photovoltaic array (e.g., moveable portion 112 described with respect to FIG. 1A, moveable portion 212 described with respect to FIG. 2A, etc.), such that when a portion of linkage 611 moves, the linkage 611 causes the corresponding movable portion to move.

Referring to the embodiment of FIG. 1A, FIG. 1B and FIG. 1C, for example, a portion of linkage 611 may be physically coupled to a gear system (FIG. 6C) that converts motion of linkage 611 in a first plane (e.g., the X-Y plane of FIG. 6A and FIG. 6B) to motion in a plane normal to the first plane (e.g., motion in the X-Z axis and/or motion in the Y-Z axis of FIG. 1A and FIG. 1B, for example). Said gear system then transmits rotational motion in a first direction to rod or hinge 105 to urge movable portion 112 to pivot from an open configuration to a closed configuration, and transmits rotation motion in a direction opposite to the first direction to rod or hinge 105 to urge movable portion 112 to pivot from a closed configuration to an open configuration.

Figure 6C:
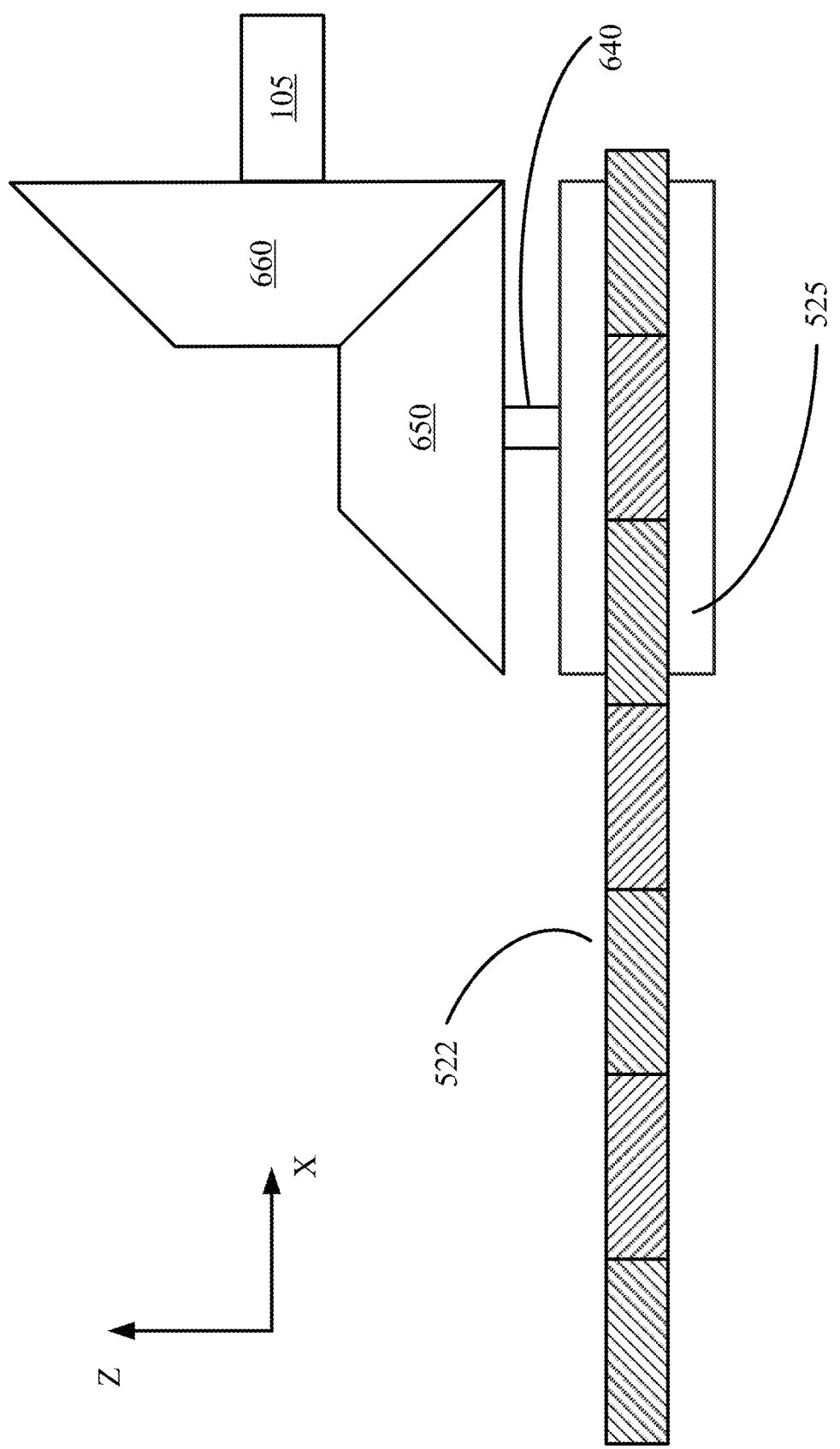
FIG. 6C. schematically illustrates an embodiment of a portion of movement mechanism in accordance with embodiments of the present disclosure.

As schematically illustrated in FIG. 6C, motion of linkage 522 causes linkage fitting 525 to rotate. Linkage fitting 525 is coupled to gear shaft 640 that, in turn, causes gear 650 to rotate, which in turn causes gear 660 to rotate. Rotation motion of gear 660 then causes rod or hinge 105 to rotate, thereby causing movable portion 112 to pivot around rod or hinge 105.

Referring to the embodiment of FIGS. 2A and 2B, for example, a portion of linkage 611 may be physically coupled to a corresponding movable portion 212, so that when said portion of linkage 611 moves along a first axis (e.g., the X-axis in FIG. 6B), the corresponding movable portion 212 also moves or slides in a direction parallel to the first axis. Such motion in one direction may urge the corresponding movable portion 212 from an open configuration to a closed configuration, and such motion in an opposing direction may urge the corresponding movable portion 212 from a close configuration to an open configuration.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A photovoltaic system comprising: a frame comprising a fixed portion configured to removably couple to a structure, and a set of moveable petals, each movable petal controllably movable relative to the fixed portion; a set of photovoltaic panels, each photovoltaic panel of the set of photovoltaic panels coupled to a corresponding one of the moveable petals by a corresponding set of panel fasteners; and a movement mechanism operably coupled to the set of moveable petals, the movement mechanism configured to controllably cause each moveable petal to move, relative to the fixed portion of the frame, between a secured configuration and an exposed configuration.

P2. The photovoltaic system of P1, wherein the movement mechanism is configured to be manually powered.

P3. The photovoltaic system of any of P1-P2, wherein each set of panel fasteners is obscured from external access when its corresponding petal is in the secured configuration.

P4. The photovoltaic system of any of P1-P3, wherein the set of petals comprises a plurality of petals, and in the secured configuration, the petals are disposed in a stacked configuration relative to one another.

P5. The photovoltaic system of any of P1-P4, wherein each petal is configured to be controllably repositioned with respect to a location of a light source.

P6. The photovoltaic system of any of P1-P5, wherein the fixed portion of the frame defines a frame plane, and each petal of the set of petals is moveably coupled to the frame to as to rotate out of the frame plane.

P7. The photovoltaic system of any of P1-P6, wherein the fixed portion of the frame defines a frame plane, and wherein each petal of the set of petals is movably coupled to the fixed portion of the frame by a rail and is configured to move along a path of the rail so as to translate in a plane parallel to the frame plane.

P8 The photovoltaic system of any of P1-P7, wherein, for each petal, its set of panel fasteners is obscured from external access when the petal is in the secured configuration, and said set of panel fasteners is accessible from space outside the frame when the petal is in the exposed configuration, such that a photovoltaic panel is removable from the petal when the petal is in the exposed configuration.

P9. The photovoltaic system of any of P1-P8, wherein the frame is removably coupled to the structure by a set of frame fasteners, and wherein: when the set of petals is in the secured configuration, the set of frame fasteners is obscured from external access; and when the set of petals is in the exposed configuration, the set of frame fasteners is exposed such that said set of frame fasteners are accessible from space outside of the first portion of the frame such that said set of frame fasteners can be removed from the fixed portion of the frame.

P10. The photovoltaic system of any of P1-P9, wherein the movement mechanism includes at least one of a crank system, a hydraulic system, a pneumatic system, or an electrical system.

P11. The photovoltaic system of any of P1-P10, wherein the movement mechanism is configured to be operated with a keyed handle configured to removably couple to the movement mechanism.

P12. The photovoltaic system of P11, wherein the movement mechanism comprises a rod configured to rotate about a first axis, a first end of the rod configured to removably couple to with the keyed handle, and a second end of the rod coupled to a first gear, the first gear configured to engage a first chain, the first chain configured to move the set of petals between the open configuration and the secured configuration, wherein rotating the keyed handle about a second axis causes the rod to rotate about the first axis, and wherein the movement mechanism is mechanically disadvantaged from operating without the keyed handle.

P13. The photovoltaic system of any of P1-P12, wherein a portion of a housing around the movement mechanism is configured to removably couple to the frame.

P14. The photovoltaic system of any of P1-P13, wherein the structure comprises a shipping container.

P15. The photovoltaic system of any of P1-P14, further comprising a set of fixed photovoltaic panels removably secured to the fixed portion of the frame.

P16. The photovoltaic system of any of P1-P15, further comprising: an electrical system that electrically couples to the set of photovoltaic panels in the exposed configuration, wherein the electrical system is configured to electrically couple the photovoltaic panels to an inverter, wherein the inverter is electrically coupled to a battery system.

P17. An apparatus for securing photovoltaic panels comprising: a frame configured to removably couple to a structure; a first portion of the frame configured to receive at least a first photovoltaic panel, wherein the first portion is configured couple to a first side of the first photovoltaic panel, wherein a second side of the photovoltaic panel comprises a first are of photovoltaic material; a second portion of the frame configured to receive at least a second photovoltaic panel, wherein the second portion of the frame is configured to movably couple to a first side of the second photovoltaic panel, wherein a second side of the second photovoltaic panel comprises an area of photovoltaic material; and a movement mechanism coupled to the frame, the movement mechanism configured to cause the second photovoltaic panel to move between a first configuration and a second configuration.

P18. The apparatus of P17, wherein the frame is configured to removably couple to the structure by a set of fasteners, wherein the set of fasteners are obscured in the first configuration, wherein a subset of fasteners of the set of fasteners can removably couple the frame to the structure when the second photovoltaic panel is in the second configuration.

P19. A system comprising: a frame removably coupled to a kiosk, wherein the kiosk comprises a first space and a second space; a first photovoltaic panel coupled to a fixed portion of the frame, the first photovoltaic panel comprising a first side configured to face away from the frame, the first side comprising a first area of photovoltaic material; a second photovoltaic panel coupled to a moveable portion of the frame, the second photovoltaic panel comprising a first side configured to face away from the frame, the first side of the second photovoltaic panel comprising a second area of photovoltaic material; a movement mechanism configured to cause the second photovoltaic panel to move between a first configuration and a second configuration, wherein a first portion of a housing of the movement mechanism is removably coupled to the frame, wherein a second portion of the housing of the movement mechanism is removably coupled to the kiosk; and an electrical sub-system electrically coupled to the first photovoltaic panel and the second photovoltaic panel respectively, wherein components of the electrical sub-system are physically coupled to the first photovoltaic panel and the second photovoltaic panel respectively, such that respective components of the electrical sub-system physically coupled to the second photovoltaic panel are configured to move with the second photovoltaic panel when the movement mechanism is engaged.

P20. The system of P19, wherein the kiosk comprises a first space divided from a second space, and wherein the electrical sub-system further comprises: an inverter within the first space of the kiosk, the inverter configured to electrically couple to the first photovoltaic panel and the second photovoltaic panel; and a battery system within the first space of the kiosk, the battery system configured to electrically couple to the inverter.

P101: A system for controllably securing a set of photovoltaic panels, comprising: a frame having a central area configured to hold a center photovoltaic panel, the frame configured to be removably coupled to a base structure; a set of petals movably coupled to the frame, each petal having a front side and a back side, the front side configured to hold a corresponding photovoltaic panel, each petal controllably movable into an open configuration and a secured configuration, wherein: in the open configuration each corresponding petal photovoltaic panel is exposed in a direction facing away from the base structure such that the corresponding petal photovoltaic panel is exposed, and in the secured configuration, each petal of the set of petals is stacked above the center area to produce a stack of petals, the stack of petals shielded by the back side of at least one of the petals.

P102. The system of P101 wherein, in the secured configuration, each petal of the set of petals is stacked above the center area to produce a stack of petals, the stack of petals shielded by the back side of at least one of the petals and at least one side structure.

P103. The system of any of P101 wherein, in the secured configuration, each petal of the set of petals is stacked above the center area to produce a stack of petals, the stack of petals shielded by the back side of at least one of the petals and at least one side structure, said at least one side structure comprising a skirt panel extending from a petal.

P104. The system of any of P101-P103, wherein the system is removably coupled to the base structure by a set of fasteners, each fastener of the set of fasteners obscured by the petals in the secured configuration such that the fasteners cannot be removed when the petals are in the secured configuration.

P105. The system of any of P101-P104, further comprising a crank system having a handle interface remote from the frame, the crank system mechanically coupled to the petals to controllably move the petals from the secured configuration to an open configuration, and from the open configuration to the secured configuration.

P106. The system of P105, wherein the handle interface (is configured to mechanically and operably interface with a human-powered crank handle.

P107. The system of any of P105-P106, wherein the handle interface includes a cover (540) that is lockable to prevent unauthorized access to the crank system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A photovoltaic system comprising:
    a frame comprising a fixed portion configured to removably couple to a structure, and a set of moveable petals, each movable petal controllably movable relative to the fixed portion;
    a set of photovoltaic panels, each photovoltaic panel of the set of photovoltaic panels coupled to a corresponding one of the moveable petals by a corresponding set of panel fasteners; and
    a movement mechanism operably coupled to the set of moveable petals, the movement mechanism configured to controllably cause each moveable petal to move, relative to the fixed portion of the frame, between a secured configuration and an exposed configuration, the movement mechanism configured to be operated with a keyed handle configured to removably couple to the movement mechanism, and the movement mechanism is mechanically disadvantaged from operating without the keyed handle,
    the movement mechanism comprising a rod configured to rotate about a first axis, a first end of the rod configured to removably couple to the keyed handle, and a second end of the rod coupled to a first gear, the first gear configured to engage a first chain, the first chain configured to move the set of petals between the exposed configuration and the secured configuration, wherein rotating the keyed handle about a second axis causes the rod to rotate about the first axis.

2. The photovoltaic system of claim 1, wherein the movement mechanism is configured to be manually powered.

3. The photovoltaic system of claim 1, wherein each set of panel fasteners is obscured from external access when its corresponding petal is in the secured configuration.

4. The photovoltaic system of claim 1, wherein the set of petals comprises a plurality of petals, and in the secured configuration, the petals are disposed in a stacked configuration relative to one another.

5. The photovoltaic system of claim 1, wherein each petal is configured to be controllably repositioned with respect to a location of a light source.

6. The photovoltaic system of claim 1, wherein the fixed portion of the frame defines a frame plane, and each petal of the set of petals is moveably coupled to the frame so as to rotate out of the frame plane.

7. The photovoltaic system of claim 1, wherein the fixed portion of the frame defines a frame plane, and wherein each petal of the set of petals is movably coupled to the fixed portion of the frame by a rail and is configured to move along a path of the rail so as to translate in a plane parallel to the frame plane.

8. The photovoltaic system of claim 1, wherein, for each petal, its set of panel fasteners is obscured from external access when the petal is in the secured configuration, and said set of panel fasteners is accessible from space outside the frame when the petal is in the exposed configuration, such that a photovoltaic panel is removable from the petal when the petal is in the exposed configuration.

9. The photovoltaic system of claim 1, wherein the frame is removably coupled to the structure by a set of frame fasteners, and wherein:
    when the set of petals is in the secured configuration, the set of frame fasteners is obscured from external access; and
    when the set of petals is in the exposed configuration, the set of frame fasteners is exposed such that said set of frame fasteners are accessible from space outside of the first portion of the frame such that said set of frame fasteners can be removed from the fixed portion of the frame.

10. The photovoltaic system of claim 1, wherein the movement mechanism includes at least one of a crank system, a hydraulic system, a pneumatic system, or an electrical system.

11. The photovoltaic system of claim 1, wherein a portion of a housing around the movement mechanism is configured to removably couple to the frame.

12. The photovoltaic system of claim 1, wherein the structure comprises a shipping container.

13. The photovoltaic system of claim 1, further comprising a set of fixed photovoltaic panels removably secured to the fixed portion of the frame.

14. The photovoltaic system of claim 1, further comprising:
    an electrical system that electrically couples to the set of photovoltaic panels in the exposed configuration, wherein the electrical system is configured to electrically couple the photovoltaic panels to an inverter, wherein the inverter is electrically coupled to a battery system.

15. An apparatus for securing photovoltaic panels comprising:
    a frame configured to removably couple to a structure;
    a first portion of the frame configured to receive at least a first photovoltaic panel, wherein the first portion is configured couple to a first side of the first photovoltaic panel, wherein a second side of the photovoltaic panel comprises a first area of photovoltaic material;
    a second portion of the frame configured to receive at least a second photovoltaic panel, wherein the second portion of the frame is configured to movably couple to a first side of the second photovoltaic panel, wherein a second side of the second photovoltaic panel comprises an area of photovoltaic material; and
    a movement mechanism coupled to the frame, the movement mechanism configured to cause the second photovoltaic panel to move between a first configuration and a second configuration,
        the movement mechanism configured to be operated with a keyed handle configured to removably couple to the movement mechanism, wherein the movement mechanism mechanically disadvantaged from operating without the keyed handle,
        the movement mechanism comprising a rod configured to rotate about a first axis, a first end of the rod configured to removably couple to the keyed handle, and a second end of the rod coupled to a first gear, the first gear configured to engage a first chain, the first chain configured to move the set of petals between the exposed configuration and the secured configuration, wherein rotating the keyed handle about a second axis causes the rod to rotate about the first axis.

16. The apparatus of claim 15, wherein the frame is configured to removably couple to the structure by a set of fasteners, wherein the set of fasteners are obscured in the first configuration, wherein a subset of fasteners of the set of fasteners can removably couple the frame to the structure when the second photovoltaic panel is in the second configuration.

17. A system comprising:
   a frame removably coupled to a kiosk, wherein the kiosk comprises a first space and a second space;
   a first photovoltaic panel coupled to a fixed portion of the frame, the first photovoltaic panel comprising a first side configured to face away from the frame, the first side comprising a first area of photovoltaic material;
   a second photovoltaic panel coupled to a moveable portion of the frame, the second photovoltaic panel comprising a first side configured to face away from the frame, the first side of the second photovoltaic panel comprising a second area of photovoltaic material;
   a movement mechanism configured to cause the second photovoltaic panel to move between a first configuration and a second configuration, wherein a first portion of a housing of the movement mechanism is removably coupled to the frame, wherein a second portion of the housing of the movement mechanism is removably coupled to the kiosk, the movement mechanism configured to be operated with a keyed handle configured to removably couple to the movement mechanism, the movement mechanism mechanically disadvantaged from operating without the keyed handle,
   the movement mechanism comprising a rod configured to rotate about a first axis, a first end of the rod configured to removably couple to with the keyed handle, and a second end of the rod coupled to a first gear, the first gear configured to engage a first chain, the first chain configured to move the set of petals between the exposed configuration and the secured configuration, wherein rotating the keyed handle about a second axis causes the rod to rotate about the first axis; and
   an electrical sub-system electrically coupled to the first photovoltaic panel and the second photovoltaic panel respectively, wherein components of the electrical sub-system are physically coupled to the first photovoltaic panel and the second photovoltaic panel respectively, such that respective components of the electrical sub-system physically coupled to the second photovoltaic panel are configured to move with the second photovoltaic panel when the movement mechanism is engaged.

18. The system of claim 17, wherein the kiosk comprises a first space divided from a second space, and wherein the electrical sub-system further comprises:
   an inverter within the first space of the kiosk, the inverter configured to electrically couple to the first photovoltaic panel and the second photovoltaic panel; and
   a battery system within the first space of the kiosk, the battery system configured to electrically couple to the inverter.

* * * * *